United States Patent [19]
Kubota et al.

[11] Patent Number: 6,055,247
[45] Date of Patent: Apr. 25, 2000

[54] DATA TRANSMISSION METHOD, DATA TRANSMISSION APPARATUS AND DATA TRANSMISSION SYSTEM

[75] Inventors: Tatsuya Kubota; Youichi Matsumura, both of Kanagawa, Japan

[73] Assignee: Sony Corporation, Tokyo, Japan

[21] Appl. No.: 08/793,606

[22] PCT Filed: Jul. 15, 1996

[86] PCT No.: PCT/JP96/01974

§ 371 Date: Jul. 6, 1998

§ 102(e) Date: Jul. 6, 1998

[87] PCT Pub. No.: WO97/03508

PCT Pub. Date: Jan. 30, 1997

[30] Foreign Application Priority Data

Jul. 13, 1995 [JP] Japan ................................ P07-177793

[51] Int. Cl.⁷ ....................................................... H04J 3/06
[52] U.S. Cl. ........................... 370/508; 375/356; 370/519
[58] Field of Search ................................. 370/464, 498, 370/503, 507, 508, 509, 516, 517, 518, 519; 375/354, 356, 358; 455/512

[56] References Cited

U.S. PATENT DOCUMENTS

| | | | |
|---|---|---|---|
| 5,301,193 | 4/1994 | Toyofuku et al. | 370/395 |
| 5,450,394 | 9/1995 | Gruber et al. | 370/253 |
| 5,521,907 | 5/1996 | Ennis, Jr. et al. | 370/253 |
| 5,541,927 | 7/1996 | Kristol et al. | 370/408 |

FOREIGN PATENT DOCUMENTS

| | | |
|---|---|---|
| 0-336836 | 2/1991 | Japan . |
| 3-141752 | 6/1991 | Japan . |
| 6-268685 | 9/1994 | Japan . |

*Primary Examiner*—Ajit Patel
*Assistant Examiner*—Bob A. Phunkulh
*Attorney, Agent, or Firm*—Jay H. Maioli

[57] ABSTRACT

A data transmitting method, a data transmitting apparatus, and a data transmitting system by which a transmission delay time to be received by the transmission data is measured, the data is transmitted while compensating for the transmission delay in the communication line on the transmission side, and the data received at the reception side is processed. The transmitting apparatus on the reception side transmits the measurement bit to the transmission side, and the transmission side sends back this measurement bit to the reception side. The delay processing circuit on the reception side detects the time difference between the generated measurement bit and the returned measurement bit. The delay processing circuit on the reception side generates the reference signal at a timing preceding in time the reference signal in the internal portion on the reception side by exactly the detected time difference and transmits the same to the transmission side. A delay processing circuit (24) on the transmission side supplies the received reference signal to a VTR device (14b), and the VTR device (14b) generates the audio and video data in synchronization with the transmitted reference signal and transmits the same to the reception side.

31 Claims, 19 Drawing Sheets

(A) HEADER DATA  (B)  ▨ : ANCILLARY DATA

▩ : VIDEO DATA

BLANK : UNNECESSARY DATA

CONTROL (ADVANCE CONTROL) FLOWCHART OF DATA TRANSMITTING APPARATUS 3a WITH RESPECT TO VTR DEVICE 14a

DATA TRANSMISSION METHOD, DATA TRANSMISSION APPARATUS AND DATA TRANSMISSION SYSTEM

TECHNICAL FIELD

The present invention relates to a data transmitting method, a data transmitting apparatus, and a data transmitting system in which audio and video data etc. obtained from a VTR device of the D2 system are transmitted via an ATM communication line or the like by using a predetermined transmission packet, more particularly the present invention relates to a data transmitting method which measures the transmission delay time of the communication line and enables transmission compensating for the measured transmission delay time and to an apparatus for the same.

BACKGROUND ART

Conventionally, in a television broadcasting station etc., use has been made of a transmitting apparatus of a serial digital interface (SDI) system defined as SMPTE-259M in the SMPTE (Society of Motion Picture and Television Engineering) as the infrastructure for performing the transmission of audio and video data of the digital format. Further, also a serial digital data interface (SDDI) which improves upon the SDI system while maintaining compatibility and enables the transmission of variable length data and a plurality of types of data by a single transmission packet has been proposed.

Further, recently, an asynchronous transmission mode (ATM) system has been put into practical use as a high speed digital data transmission system.

There is demand for audio and video data to be sent and received (transmitted) via an ATM communication line between television broadcasting stations by the SDI system or the SDDI system. However, the transmission packet of the above SDI system has a one-word 10-bit configuration while the ATM cell used in a communication line of the ATM system has a one-word eight-bit configuration. Accordingly, the transmission packet of the SDI system can not be used for an ATM communication line as it is.

Further, in television broadcasting stations etc., there are cases where the transmitted audio and video data should be telecast in real time. In such cases, there arises a problem of the transmission delay time produced in the communication line. That is, if the transmitted audio and video data is telecast as it is by using a synchronization signal on the reception side, there arises an inconvenience that the video is interrupted at the boundaries of the video images. In order to eliminate such an inconvenience, transmission compensating for the transmission delay time between transmission apparatuses can be considered.

In order to perform transmission while compensating for the transmission delay time, it is necessary to measure the transmission delay time. As a method for measurement of the transmission delay time, for example, there can be considered a method wherein one transmitting apparatus is regarded as a master, another transmitting apparatus is regarded as a slave, the data transmitted from the master side is returned at the slave side, and the time difference between the transmitted data and the returned data is detected. According to this method, however, because of the content of the processing at the transmitting apparatus on the master side and the content of the processing at the transmitting apparatus on the slave side, the processing is troublesome. In addition, measurement of the transmission delay time among three or more transmitting apparatuses connected to the communication line is difficult.

DISCLOSURE OF THE INVENTION

An object of the present invention is to provide a data transmitting method, a data transmitting apparatus, and a data transmitting system by which the audio and video data is preliminarily produced and transmitted earlier by exactly an amount of the transmission delay time to compensate for the transmission delay in the communication line and thus the audio and video data received on the reception side can be processed in real time.

Further, another object of the present invention is to provide a data transmitting method, a data transmitting apparatus, and a data transmitting system wherein the content of the processing at each of the transmitting apparatuses is made the same at the time of measurement of the transmission delay time, whereby the measurement can be easily carried out and therefore the data can be transmitted while compensating for the transmission delay time among these transmitting apparatuses.

Further, still another object of the present invention is to provide a data transmitting method, a data transmitting apparatus, and a data transmitting system wherein the transmission delay time among three or more transmitting apparatuses can be measured and therefore the data can be transmitted while compensating for the transmission delay time among these transmitting apparatuses.

Further, another object of the present invention is to provide a data transmitting method, a data transmitting apparatus, and a data transmitting system wherein for example data transmission between the transmitting apparatus of the SDI system and the transmitting apparatus of the ATM system is enabled.

Further, another object of the present invention is to provide a data transmitting method, a data transmitting apparatus, and a data transmitting system by which data of the SDI system having a one-word 10-bit configuration can be converted to data of the ATM system having a one-word eight-bit structure.

Further, another object of the present invention is to provide a data transmitting method, a data transmitting apparatus and a data transmitting system wherein control data used for editing of the audio and video data or the audio data for communication between a user on transmission side and a user on reception side can be transmitted together with the audio and video data.

A first data transmitting method according to the present invention is a data transmitting method for transmitting predetermined transmission data via a communication line of the asynchronous transfer mode from a transmission side to a reception side where the processing time is determined so that the transmission data arrives at the processing time, wherein a transmission delay time produced in the transmission data transmitted and received between the transmission side and the reception side is measured and, at the transmission side, transmission data is generated preceding the time at which the transmission side transmits that transmission data by exactly that transmission delay time and the generated transmission data is transmitted to the reception side via the communication line.

Preferably, the method is characterized in that the predetermined transmission data is audio data and video data or one of the same.

Preferably, at the reception side, a two way delay time indicating a two way transmission delay time between the reception side and the transmission side is measured as the transmission delay time; a reference time indicating a timing at which the transmission data is to be generated to the transmission side is generated preceding the time at which the transmission data is transmitted by the transmission side by exactly the two way delay time and the generated reference signal is transmitted to the transmission side via the communication line; on the transmission side, the transmission data is generated at a timing indicated by the reference signal transmitted from the transmission side via the communication line; and the generated transmission data is transmitted to the reception side.

Preferably, on the transmission side, a two way delay time indicating a two way transmission delay time between the reception side and the transmission side is measured as the transmission delay time and when the advance reproduction request is input from the reception side, the transmission data is generated preceding the time at which the transmission data is to be transmitted by exactly the transmission delay time and the generated transmission data is transmitted to the reception side via the communication line.

In the first data transmitting method according to the present invention, the transmission data is transmitted from the transmission side via for example an ATM communication line so that the audio and video data reproduced by a VTR device of the D2 system for which the time for processing on the reception side is determined arrives at the processing time on the reception side.

In the first data transmitting method, first, between the transmission side and reception side, the transmission delay time given to the transmission data by the processing in the data transmitting apparatus on the transmission side and the processing in the data transmitting apparatus on the reception side and the communication line is measured.

The data transmitting apparatus on the transmission side generates the transmission data preceding an actual time by exactly the measured transmission delay time and transmits the same to the reception side.

The data transmitting apparatus on the reception side measures the two way transmission delay time between the data transmitting apparatus on the reception side and the data transmitting apparatus on the transmission side by the method of sending back the predetermined measurement data on the transmission side etc.

Further, corresponding to for example the vertical synchronization signal of the video signal, a reference signal for defining the timing at which the data transmitting apparatus on the transmission side generates the transmission data is generated at an earlier time than the actual time by exactly the measured two way delay time and is transmitted to the data transmitting apparatus on the transmission side.

The data transmitting apparatus on the transmission side generates the audio and video data from the VTR device in synchronization with the transmitted reference signal and transmits the same to the data transmitting apparatus on the transmission side as the transmission data.

Further, the first data transmitting apparatus according to the present invention is a data transmitting apparatus for transmitting predetermined transmission data via a communication line of an asynchronous transfer mode from a data transmitting apparatus on a transmission side to a data transmitting apparatus on a reception side where the processing time is determined so that the transmission data arrives at the processing time, the first data transmitting apparatus having a transmitting means for generating the transmission data preceding the time at which the transmission side transmits the transmission data by exactly the transmission delay time produced between the data transmitting apparatus on the transmission side and the data transmitting apparatus on the reception side and a receiving means for receiving the transmission data and the transmission delay time data indicating the transmission delay time via the communication line and outputting the transmission delay time data to the transmitting means.

Preferably, the data transmitting apparatus has a transmission data generating means and the transmitting means has a delay processing means for receiving as its input the transmission delay time and outputting a control signal for controlling the generation of the transmission data of the transmission data generating means so as to be preceding the time at which the transmission side transmits the transmission data by exactly the transmission delay time produced between the data transmitting apparatus on the transmission side and the data transmitting apparatus on the reception side and a data transmitting means for receiving as its input the transmission data from the transmission data generating means generated under the control of the control signal and transmitting the transmission data to the data transmitting apparatus on the reception side via the communication line.

Preferably, the apparatus is characterized in that the predetermined transmission data is audio data and video data or one of the same.

Preferably, the delay processing means has a measurement data generating means for generating the measurement data for measuring the transmission delay time and a time difference detecting means for receiving as its input the transmission delay time data and the measurement data from the measurement data generating means, calculating the transmission delay time, and outputting the control signal for controlling the generation of the transmission data.

Preferably, the data transmitting means has a memory means for receiving as its input the transmission data and outputting the transmission data stored by using a clock in synchronization with the communication line and a multiplexing means for multiplexing the transmission data output from the memory means and the predetermined measurement data for measuring the transmission delay time at a predetermined position of the predetermined transmission packet and outputting the same to the communication line.

Preferably, the apparatus is characterized in that the receiving means of the data transmitting means has a data receiving means for receiving the transmission data transmitted via the communication line and a clock controlling means for receiving as its input a reference signal of the data transmitting apparatus on the transmission side multiplexed on the transmission data output from the data receiving means and a clock output from the clock generating means, outputting a clock control signal for performing control so that the clock output from the clock generating means is synchronized with the reference signal of the receiving means when the receiving means is synchronized to the transmission data, and outputting a clock control signal for performing control so that the receiving means is synchronized with the clock from the clock generating means when an advance reproduction request command is input from the data transmitting apparatus on the transmission side; and the clock is output to the data receiving means based on the clock control signal from the clock generating means.

Preferably, the data receiving means has a demultlplexing means for demultiplexing the transmission data contained in the predetermined transmission packet of the predetermined communication line and the predetermined measurement data for measuring the transmission delay time and outputting the measurement data to the transmitting means of the data transmitting apparatus.

A second data transmitting method according to the present invention is a data transmitting method for transmitting transmission data of the D2 system comprised by audio data and video data or one of the same via a predetermined communication line of an asynchronous transfer mode supplying a predetermined clock by using a predetermined transmission packet, wherein the transmission data is converted to a word width adapted to the communication line and shuffled and synchronization data indicating an operation timing of the transmission side with respect to a line clock supplied by the communication line and used for matching the operation timing on the reception side with the operation timing on the transmission side, identification data used for identifying the transmission data, data amount indication data indicating the data amount of the transmission data contained in same the transmission packet, shuffling data indicating the shuffling method with respect to the transmission data, predetermined control data transmitted between the transmission side and the reception side, measurement data used for measuring the transmission delay time produced between the transmission side and the reception side, call data used for the call between the transmission side and the reception side, and the shuffled transmission data are multiplexed are transmitted in the predetermined transmission packet.

Preferably, when the communication line has an inhibit code for inhibiting the transmission, additional data not causing the inhibit code is added to each of the data for which the inhibit code may be produced among the data contained in the transmission packet when the data are combined.

Preferably, on the reception side, the time at which the transmission data is processed is determined and the transmission data contained in the transmission packet is produced earlier than the time at which the transmission data is transmitted from the transmission side by exactly the transmission delay time received until it reaches the reception side from the transmission side.

Preferably, the identification data contains delay time data indicating the time at which the transmission delay time is produced earlier than the time at which the transmission data is transmitted from the transmission side on the transmission side.

Preferably, the reception side receives the transmission packet from the communication line; demultiplexes the transmission data, the synchronization data, the identification data, the data amount indication data, the shuffling data, the control data, the measurement data, and the call data from the received transmission packet, deshuffles the transmission data based on the demultiplexed shuffling data, and converts the deshuffled transmission data to its original word width.

The second data transmitting method according to the present invention handles the audio data and video data of the D2 system etc. as the object of transmission (transmission data), multiplexes them in a predetermined transmission packet together with other predetermined data, and transmits the same via an ATM communication line or the like.

For example, in the data transmitting method according to the present invention, transmission data having the one-word 10-bit configuration adapted to a transmitting system such as the SDI system (SMPTE-259M) is converted to a one-word eight-bit configuration adapted to the ATM communication line and further shuffling processing is carried on with respect to the transmission data so as to facilitate the correction of data errors generated when transmitting the data through the communication line.

The synchronous data indicates the operation timing on the transmission side as a whole number ratio of the frequency of the line clock signal supplied by the ATM communication line and the frequency of the internal clock signal on the transmission side. This synchronization data is used for generating the internal clock on the reception side in synchronization with the internal clock on the transmission side from the line clock on the reception side. On the reception side, the operation timing is determined based on the generated internal clock. The operation timing on the transmission side and the operation timing on the reception side are synchronized.

The identification data indicates on which line of which field the transmission data contained in the same transmission packet exists.

The data amount indication data indicates the data amount of the transmission data contained in the same transmission packet.

The shuffling data is used for returning the transmission data after the shuffling to the original order and indicates the shuffling method with respect to the transmission data on the transmission side.

The control data is transmitted between data terminals such as personal computers connected to the transmission side and reception side and is used for controlling for example a VTR device or an editing apparatus connected to the reception side.

The measurement data is used for measuring the transmission delay time received during a period when the transmission data is transmitted from the transmission side to the reception side.

The call data is PCM audio data of for example (15.75 kHz/2)×8 bits and is used for a call between the transmission side and the reception side.

These data and the shuffled audio data are multiplexed in the transmission packet and transmitted from the transmission side to the reception side.

Further, a second data transmitting apparatus according to the present invention is a data transmitting apparatus for transmitting transmission data from a first data transmitting apparatus via a predetermined communication line of an asynchronous transfer mode so that a predetermined transmission data for which a processing time in a second data transmitting apparatus is determined arrives at the processing time in the second data transmitting apparatus, having a transmission data generating means for generating the transmission data preceding the time at which the transmission data is transmitted from the first data transmitting apparatus by exactly the transmission delay time produced between the first data transmitting apparatus and the second data transmitting apparatus; a word width converting means for converting the transmission data to a word width adapted to the communication line; a shuffling means for shuffling the generated transmission data; and a transmitting means for multiplexing the shuffled transmission data, synchronization data indicating the operation timing of the first data transmitting apparatus with respect to a line clock supplied by the communication line and used for matching the operation timing of the second data transmitting apparatus with the operation timing of the first data transmitting apparatus, identification data used for identifying the transmission data amount indication data indicating the data amount of the transmission data contained in the same transmission packet, shuffling data indicating the shuffling method with respect to the transmission data, predetermined control data transmitted between the transmission side and the reception side, measurement data used for measuring the transmission delay time produced between the transmission side and the reception side, and call data used for a call between the transmission side and the reception side and for transmitting the predetermined transmission packet via the communication line to the second data transmitting apparatus.

Preferably, the second data transmitting apparatus has a receiving means for receiving the transmission packet from the communication line; a demultiplexing means for demultiplexing the transmission data, the synchronization data, the data amount indication data, the shuffling data, the control data, the measurement data, and the call data from the received transmission packet; a deshuffling means for deshuffling demultiplexed the transmission data based on the demultiplexed shuffling data; and a word width reverse converting means for converting the deshuffled transmission data to the original word width.

A data transmitting system according to the present invention is a data transmission system wherein predetermined transmission data is output from a predetermined recording and reproducing apparatus, the transmission data reaches a data transmitting apparatus on the reception side for which the processing time is determined at the processing time from the data transmitting apparatus on the transmission side via a predetermined communication line of an asynchronous transfer mode, and the processing of the transmission data is carried out by a recording and reproducing apparatus on the reception side, data transmitting system having a transmitting means for generating the transmission data preceding the time at which the transmission data from the recording and reproducing apparatus on transmission side is transmitted by exactly the transmission delay time produced between the data transmitting apparatus on the transmission side and the data transmitting apparatus on the reception side; and a receiving means for receiving the transmission data and transmission delay time data indicating the transmission delay time via the communication line and outputting the transmission delay time to the transmitting means.

Preferably, the transmitting means of the data transmitting system has a delay processing means for receiving as its input the delay time data and outputting a control signal for controlling the output of the transmission data from the recording and reproducing apparatus on the transmission side so as to be preceding the time at which the recording and reproducing apparatus on transmission side transmits the transmission data by exactly the transmission delay time to the recording and reproducing apparatus on the transmission side and a data transmitting means for receiving as its input the transmission data and transmitting the transmission data to the data transmitting apparatus on the reception side via the communication line.

Preferably, the system is characterized in that the predetermined transmission data is audio data and video data or one of the same.

Preferably, the delay processing means has a measurement data generating means for generating the measurement data for measuring the transmission delay time and a time difference detecting means for receiving as its inputs the transmission delay time data and the measurement data from the measurement data generating means, calculating the transmission delay time, and outputting the control signal for controlling the generation of the transmission data to the recording and reproducing apparatus on the transmission side.

Preferably, the data transmitting means has a memory means for receiving as its input the transmission data and outputting the stored transmission data by using a clock in synchronization with the communication line and a multiplexing means for multiplexing the transmission data output from the memory means and the measurement data for measuring the transmission delay time at a predetermined position of the predetermined transmission packet and outputting the same to the communication line.

Preferably, the system is characterized in that the receiving means of the data transmitting apparatus has a clock generating means, a data receiving means for receiving the transmission data transmitted via the communication line, and a clock controlling means for receiving as its input the reference signal of the data transmitting apparatus on the transmission side multiplexed on the transmission data output from the data receiving means and the clock output from the clock generating means, outputting a clock control signal for performing the control so that the clock output from the clock generating means is synchronized with the reference signal of the receiving means when the receiving means is synchronized with the transmission data, and outputting a clock control signal for performing the control so that the receiving means is synchronized with the clock from the clock generating means when the advance reproduction request command is input from the data transmitting apparatus on the transmission side; and the clock is output to the data receiving means and the recording and reproducing apparatus on the reception side based on the clock control signal from the clock generating means.

Preferably, the data receiving means has a demultiplexing means for demultiplexing the transmission data contained in the predetermined transmission packet and the predetermined measurement data for measuring the transmission delay time and for outputting the demultiplexed measurement data to the transmitting means of the data transmitting apparatus.

BRIEF DESCRIPTION OF THE DRAWINGS

The above objects and features of the present invention and other objects and features will be more apparent from the following description given with reference to the accompanying drawings, wherein.

BEST MODE FOR CARRYING OUT OF THE INVENTION

Figure 1:
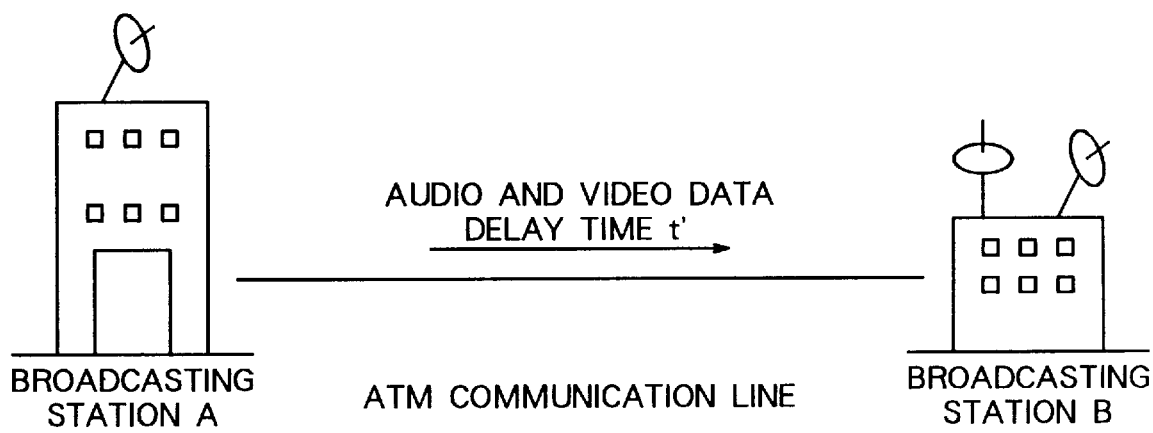
FIG. 1 is a view of a transmission delay time produced in a communication line.

FIG. 1 is a view of the transmission delay time produced in a communication line.

In a television broadcasting station etc., there are cases where the transmitted audio and video data should be telecast in real time. In such cases, as shown in FIG. 1, there arises a problem due to the transmission delay time produced in the communication line. The data transmitting system according to the present invention shown in the following embodiments is configured so as to solve the problem derived from the transmission delay time produced in the communication line.

First Embodiment

Below, a first embodiment of the present invention will be explained.

Figure 2:
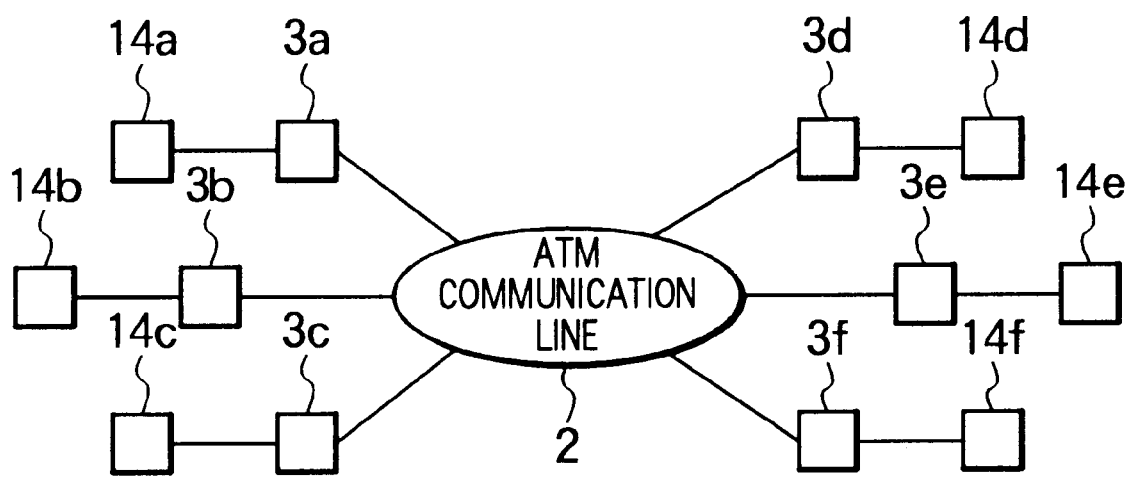
FIG. 2 is a view of the configuration of a data transmitting system according to the present invention in a first embodiment.

FIG. 2 is a view of the configuration of a data transmitting system 1 according to the present invention in a first embodiment.

As shown in FIG. 2, the data transmitting system 1 is configured by the data transmitting apparatuses 3a to 3f to which VTR devices 14a to 14f are respectively connected being connected to each other via an ATM communication line 2.

The data transmitting apparatuses 3a to 3f mutually transmit the predetermined transmission data, for example, the audio and video data for programs or relay use via the ATM communication line 2.

Note that, the frequency of a line clock NCLK by eight to obtain 19,44 kHz, is which is obtained by dividing the frequency of the clock of 155.52 MHz respectively supplied from the ATM communication line 2 to the data transmitting apparatuses 3a to 3f and the frequency is used when processing the ATM cells as 8-bit parallel data. On the other hand, an Internal clock $4f_{sc}$ used in the data transmitting apparatuses 3a to 3f when performing the transmission by the SDI system is about 14.3 MHz. Where they are respectively correct, the frequencies of these clocks have a relationship of a whole number ratio (NCLK: $4f_{sc}$=1188:875).

The VTRs 14a to 14f record and reproduce the digital audio and video data of the D2 standard in synchronization with the internal clock $4f_{sc}$ and output the same to each of the data transmitting apparatuses 3a to 3f in a 143 Mbps serial format by the SDI system or the SDDI system obtained by enhancing the SDI system (hereinafter simply referred to as the SDI system).

Figure 3:
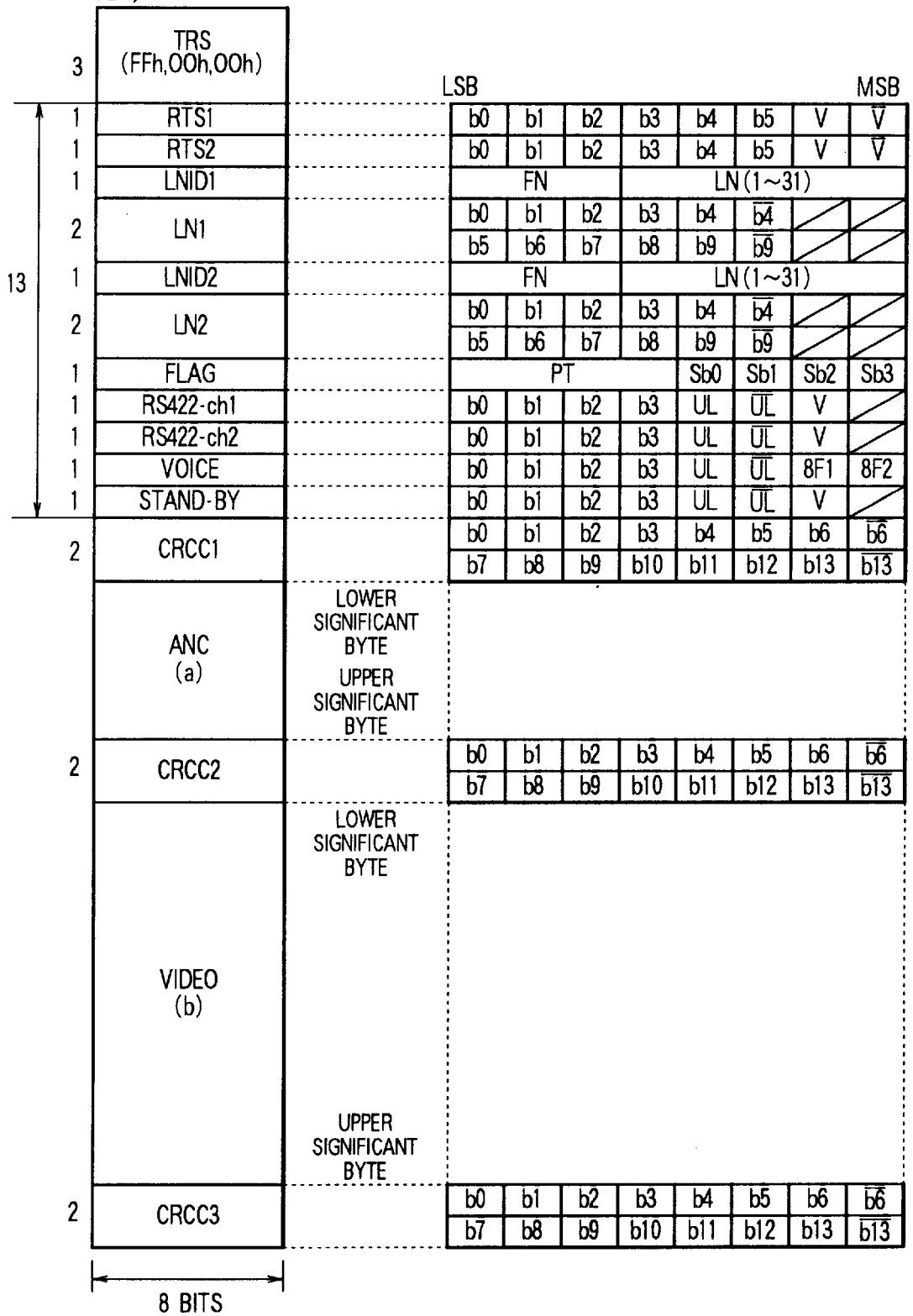
FIG. 3 is a view of the configuration of a transmission packet (PDU packet) which is mutually transmitted by the data transmitting apparatuses shown in FIG. 2 via the ATM communication line.

FIG. 3 is a view of the configuration of the transmission packet transmitted by the data transmitting apparatuses 3a to 3f shown in FIG. 2 to each other via the ATM communication line 2 (SSCU-PDU packet, hereinafter, abbreviated as "PDU packet"). Note that, the numerals attached to the left of the PDU packet indicate the byte length of each data, and the table attached to the right of the PDU packet indicates the content of corresponding data.

The PDU packet is comprised by three regions including a header region, an ancillary data (ANC) region, and a video data (VIDEO) region.

First, an explanation will be made of the configuration of the header region.

The data TRS has FFh,00h,00h as the content and indicates the leading position of the PDU packet. Note that, except for the data inserted in the data TRS, ancillary data (ANC) region, and video data (VIDEO) region at intervals of 5 bytes, it is prohibited that the data contained in the PDU packet take the value of 00h or FFh.

In the data RTS (Residual Time Stamp) 1 and RTS2, synchronization data RTS taking a value of 6 bits obtained by subtracting 832 from the calculated value of internal clock $4f_{sc}$ during the 1188 cycles of the external clock NCLK is placed. Note, since the transmission packet is transmitted for a time corresponding to 910 cycles of the internal clock $4f_{sc}$, there is a possibility of appearance of two calculated values during a period where one transmission packet is transmitted. The two regions of the data RTS1 and RTS2 are secured so as to cope with such a case.

The data RTS1 and RTS2 are used for establishment of net synchronization in the data transmitting apparatus 3 on the reception side (hereinafter the data transmitting apparatus 3 is referred to when the description is made without specifying either of the data transmitting apparatuses 3a to 3f). Note that a validity bit V (Valid) is placed in the sixth bit of the data RTS1 and RTS2 and that the content of the validity bit V becomes the logical value 1 where these data are valid and becomes a logical value 0 where they are not valid. Further, in order to avoid the value of the data becoming 00h, FFh, the logic inverted value of the validity bit V is added as a seventh bit.

The data LNID (Line Number ID) is used for the identification of the audio and video data of the transmission data respectively contained in the ancillary data region and video data region in the same PDU packet, in which the zero-th to second bits indicate the field number (FN) indicating the field in which the audio and video data is contained and a third to seventh bits taking values of 0 to 31 indicate the line number (LN) indicating the line in which the audio and video data is contained. That is, in the VTR device 14 on the reception side (hereinafter VTR device 14 is referred to where the description is made without specifying either of the VTR devices 14a to 14f), the data LNID is data indicating on which line of which field the received video data exists and is required when reproducing the video data.

The data LN1 takes a value within a range of 1 to 525 and is used for the identification of the audio and video data within the range of 2 fields together with the data LNID1. In the zero-th to fourth bits of the first byte and second byte of the data LN1, the zero-th to fourth bits and fifth to ninth bits of the numerical values are placed. The logically inverted value of the fourth bit is placed in the fifth bit of each for the same reason as that for the validity bit V of the data RTS1 and RTS2.

The data LNID2 and LN2 are used where the data transmitting apparatus 3 on the transmission side performs compensation for the transmission delay time produced in the transmission data (transmission packet) in the ATM communication line 2 or the like where the time at which the data transmitting apparatus 3 on the reception side processes the transmitted transmission data is determined, for example, where the received transmission data is used in the program during telecasting in real time.

That is, the data LNID2 and LN2 indicate by how many lines earlier the VTR device 14 should reproduce the transmission data and the data transmission apparatus 3 should transmit this transmission data so as to compensate for the transmission delay time of the audio and video data contained in the same PDU packet in the television broadcasting station on the transmission side. Note that, the data LNID2 and LN2 take the same configuration as that of the above data LNID1 and LN1, use the data LNID1 and LN1 as a reference, and indicate the number of the lines corresponding to the time by which the transmission data is advanced for compensating for the transmission delay time.

Further, by referring to the data LNID2 and LN2, the transmitting apparatus 3 on the reception side can identify the shuffling method of the audio and video data contained in the ancillary data region and video data region. That is, the transmitting apparatus 3 identifies the shuffling block (at intervals of 23 lines or the like) of the part of the data regarding the video among the audio and video data based on the data LNID2 and LN2 and performs the deshuffling processing with the identified shuffling block as a unit.

In the data Flag, the packet table (PT) data indicating the data amount of the ancillary data portion and video data portion are placed in the zero-th to third bits. In the fourth to seventh bits, bits sb0 to sb3 are placed. These bits sb0 to sb3 are used for indicating the system of shuffling on the encoder side.

The data RS422-ch1 and RS422-ch2 are used for example for the transmission of the data for control using the RS422 between computers (not illustrated) connected to the data transmitting apparatuses 3 on the transmission side and reception side, respectively.

In the zero-th to third bits of the data RS422-ch1 and RS422-ch2, either of the higher significant 4 bits or lower significant 4 bits of the data which are respectively transmitted are placed. In the fourth bit is placed a bit UL (Upper/Lower) which becomes 1 where the data placed in the zero-th to third bits is the upper significant 4 bits and becomes 0 where it is the lower significant 4 bits. For the same reason as that for the validity bit V of the data RTS1 and RTS2, the logically inverted value of the fourth bit is placed in the fifth bit.

Further, to the sixth bit, a validity bit V indicating whether or not the data RS422-ch1 and RS422-ch2 are respectively valid is added.

In the data VOICE, the audio data used for communication or the like is placed. The audio data is produced at intervals of 8 bits for every 2 cycles of a horizontal synchronization signal (15.75 kHz) of the video signal so that it can be sampled with a sampling frequency almost equal to the sampling frequency of the PCM coding device used in for example general telephone communication and in addition it can be easily placed into the PDU packet in terms of timing. Accordingly, this means that one piece of audio data is transmitted over two PDU packets, each PDU packet being produced for every cycle of the horizontal synchronization signal. Note that, in the case shown in FIG. 3, the upper significant 4 bits or lower significant 4 bits of the audio data are placed in the zero-th to third bits of the data VOICE.

Further, in the fourth bit, similar to the data RS422-ch1 and RS422-ch2, a bit UL indicating whether the data of zero-th to third bits is the upper significant 4 bits or lower significant 4 bits is placed, and in the fifth bit, for the same reason as that for the validity bit V of the data RTS1 and RTS2, the logically inverted value of the fourth bit is placed. Further the validity bit V indicating whether or not the audio data is valid is added.

Further, in the sixth bit and seventh bit, bits 8F1 and 8F2 (8F is an abbreviation of 8 Frames) used for measuring the delay time to be given to the PDU packet by the internal circuit of the data transmitting apparatus 3 and the ATM communication line 2 are placed. Note that, the data to be placed in the data LNID2 and LN2 are calculated based on the delay time measured by using these bits 8F1 and 8F2.

That is, the data transmitting apparatus 3 finds the time by which the transmission of the transmission data should be advanced of the compensation of the transmission delay time by using these bits 8F1 and 8F2 and further calculates the value of the data LNID2 and LN2. Here, two bits (bits 8F1 and 8F2) are used for the transmission delay time because the data transmitting apparatus 3 on the transmission side (or reception side) performs the processing for generating the bit 8F1, multiplexing this in the PDU packet, and transmitting the same, and the data transmitting apparatus 3 on the reception side (or transmission side) performs the processing for multiplexing the value of the received bit 8F1 as it is as the bit 8F2 of the PDU packet and transmitting the same.

By performing the returning processing using such bits 8F1 and 8F2, the bit 8F1 generated by the data transmitting apparatus 3 on the transmission side (or reception side) will be returned as the bit 8F2 by the data transmitting apparatus 3 on the reception side (or transmission side). Accordingly, by comparing the time difference of the changes of the bits 8F1 and 8F2, the data transmitting apparatus 3 can measure the transmission delay time received by the transmission data (PDU packet) on the ATM communication line, and the data LNID2 and LN2 are calculated as the number of lines corresponding to the measured transmission delay time with the data LNID1 and LN1 as the reference as mentioned above.

The stand-by data is a region made empty as stand-by for a case where another purpose occurs, but similar to the data RTS1 and RTS2, the logically inverted value of the sixth bit is placed in the seventh bit so that the value does not become any of 00h and FFh.

In the data CRCC1, CRCC2, and CRCC3, an error correction code of each preceding data region is placed. Note that, similar to the data RTS1 and RTS2, the logically inverted value of the sixth bit is placed in the seventh bit so that the value does not become any of 00h and FFh.

The word length of the ancillary data region is for example 69 words. An AES/EBU data obtained by the conversion of the word width is placed there. For example, where AES/EBU data of 55 words is converted to an 8-bit configuration in the word width, the 8-bit parallel data obtained as a result of the conversion becomes 68 words and 6 bits.

In such a case, in order to prevent the generation of an inhibit code (00h, FFh), a value 01 or 10 of 2 bits is placed in the above remaining two bits. The placed 01 or 10 is cancelled when the PDU packet is reproduced in the data transmitting apparatus 3 on the reception side. Note that, in this region, the AES/EBU data comes to have an order where the lower significant words are at the front of the PDU packet and upper significant words are at the back of the PDU packet.

In the video data region, the data mainly regarding the video in the video data of the one-word eight-bit configuration adapted to the ATM communication line 2 are placed from the word width of the one-word 10-bit configuration adapted to the SDI system. Note that, the video data comes to have an order where the lower significant bytes are in front of the PDU packet and the upper significant bytes are at the back of the PDU packet.

Note that, the ancillary data region and video data region of the PDU packet have variable lengths. There also exists a case where these regions do not contain validity data. Further, the data RS422-ch1 and VOICE etc. have the validity bit V, therefore where for example only the validity data V of the data VOICE is 1 and the validity data V of the other data is 0, this means that only the data VOICE is valid and the other data are all invalid.

Below, an explanation will be made of the relationship of the transmission data multiplexed in the ancillary data region and video data region of the PDU packet and the audio and video data of the D2 system input to or output from the VTR device 14.

Figure 4:
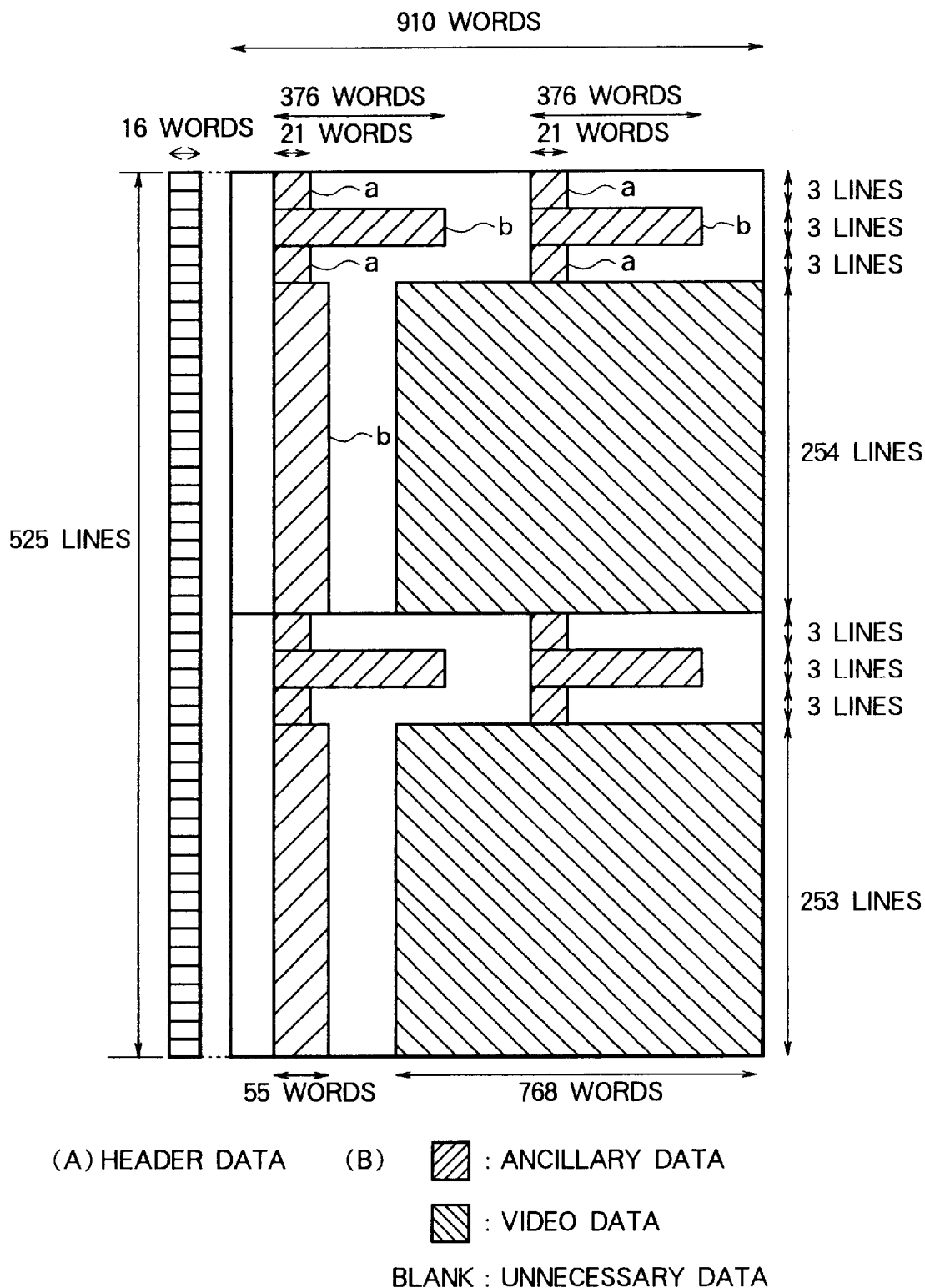
FIG. 4 is a view explaining the configuration of the audio and video data of the D2 system.

FIG. 4 is a view explaining the configuration of the audio and video data of the D2 system.

The data amount of the header data of the D2 system corresponding to a system of 525 lines and 29.97 frames per second is 16 words×8 bits for every horizontal synchronization period (1 line), therefore the data rate thereof becomes 2 Mbps as shown in the following equation.

$$16\times8 \text{ bits} \times 525 \text{ lines} \times 29.97 \text{ frames} = 2 \text{ Mbps} \quad (1)$$

Further, in a system of 525 lines and 29.97 frames per second, the number of pixels contained in one line is 910 and the data per pixel is 10 bits, therefore the data rate thereof becomes 142 Mbps as shown in the following equation.

$$910 \text{ pixels} \times 10 \text{ bits} \times 525 \text{ lines} \times 29.97 \text{ frames} = 143 \text{ Mbps} \quad (2)$$

Note, as shown in FIG. 4, there is an unnecessary part in the audio and video data of the D2 system, and only the ancillary data (audio data), video data, and the header data indicated by the hatching in FIG. 4 become necessary for the audio reproduction and video reproduction on the reception side.

The data rates of the ancillary data, the video data, and the header data shown in FIG. 4 become as in the following equations.

$$\text{Data amount a of ancillary data portion per second } 21\times10 \text{ bits} \times 12 \text{ lines} \times 29.97 \text{ frames} \times 2 = 0.15 \text{ Nbps} \quad (3)$$

$$\text{Data amount b of ancillary data portion per second } 376\times10 \text{ bits} \times 6 \text{ lines} \times 29.97 \text{ frames} \times 2 = 1.3 \text{ Nbps} \quad (4)$$

Data amount c of ancillary data portion per second 55×10 bits×

$$254 \text{ lines} \times 29.97 \text{ frames} \times 2 = 8.4 \text{ Mbps} \quad (5)$$

$$\text{Data amount d of video data portion per second } 768\times8 \text{ bits} \times (254+253) \text{ lines} \times 29.97 \text{ frames} = 93.3 \text{ Mbps} \quad (6)$$

Total data amount e of the video data portion and the ancillary data portion per second $$a+b+c+d=0.15+1.3+8.4+93.3=103.2 \text{ Mbps} \quad (7)$$

Further, when the header data is added, the data rate of the ancillary data, video data, and header data becomes 105.2 Mbps as in the following equation.

$$2+103.2=105.2 \text{ Mbps} \quad (8)$$

In this way, in the ancillary region and the video data of the PDU packet, the data of the amount of 105.2 Mbps except the unnecessary part in the audio and video data of the D2 system (143 Mbps in total) is multiplexed and the unnecessary part is eliminated, therefore room is produced in the transmission data, and the transmission of the audio and video data of the D2 system via the ATM communication line becomes possible.

By performing the transmission while multiplexing the transmission data and other data such as RTS data in the PDU packet mentioned above, not only is the transmission data simply transmitted, but also the data useful for the processing of the transmission data on the reception side can be transmitted together with this.

Further, the synchronization between the internal clock on the transmission side and the internal clock on the reception side can be achieved via the ATM communication line 2.

Furthermore, in the data transmitting apparatus 3 on the transmission side, the transmission can be carried out while compensating in advance for the transmission delay received by the PDU packet on the ATM communication line 2, and the sent transmission data can be processed in real time in the data transmitting apparatus 3 on the reception side.

Note that, in addition to the configuration shown in the first embodiment, the data transmitting system 1 according to the present invention can take various configurations, for example, the number of the data transmitting apparatuses 3 may be increased or decreased, or the number of types of the data to be multiplexed in the PDU packet may be further increased.

Second Embodiment

Below, as a second embodiment of the present invention, an explanation will be made of a method of compensating for the transmission delay time given by the ATM communication line 2 and the data transmitting apparatuses 3 on the transmission side and reception side to the PDU packet in the VTR device 14 on the transmission side. Note that, in the second embodiment, an explanation will be made while taking as an example the data transmission between the data transmitting apparatuses 3a and 3b, but it is true also for the processing of a case where the data transmission is carried out between any two among the data transmitting apparatuses 3a to 3f.

Figure 5:
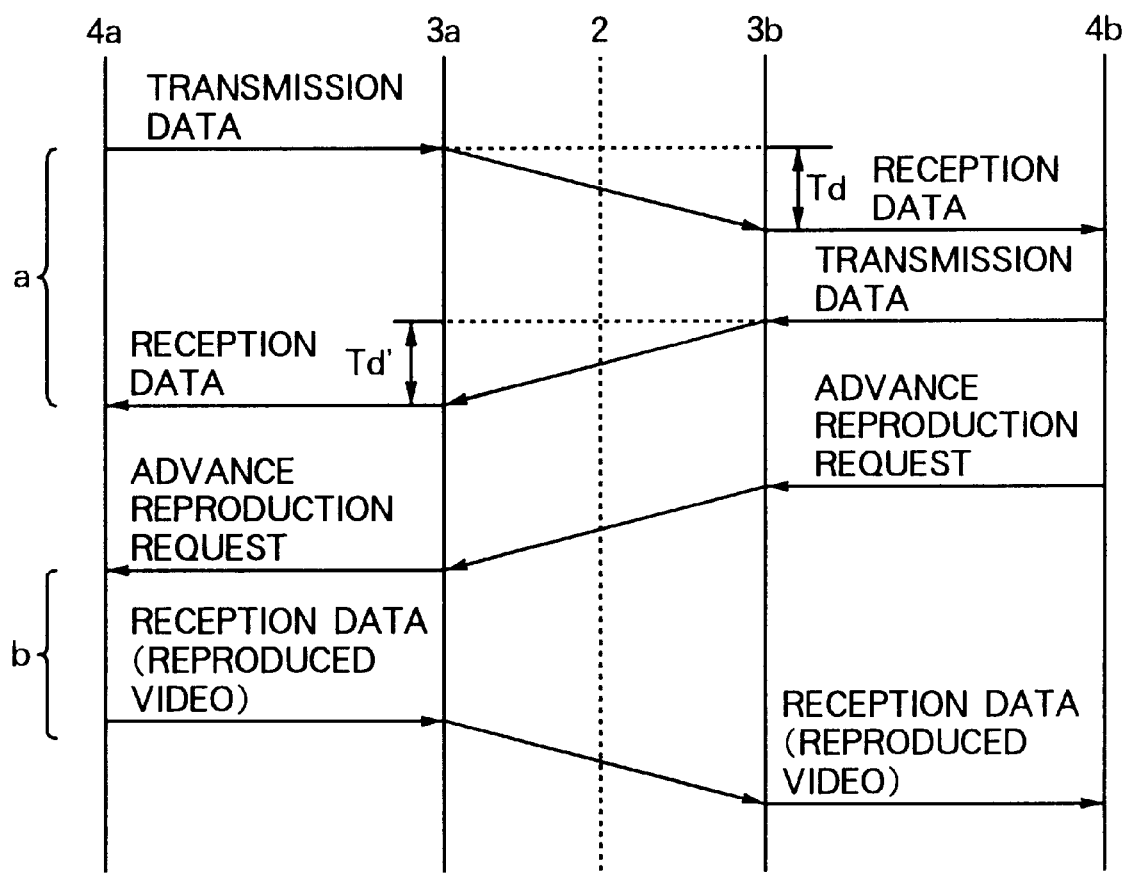
FIG. 5 is a view of the communication sequence between the data transmitting apparatuses shown in FIG. 2 in a second embodiment.

FIG. 5 is a view of the communication sequence between the data transmitting apparatuses 3a and 3b shown in FIG. 2.

Figure 6:
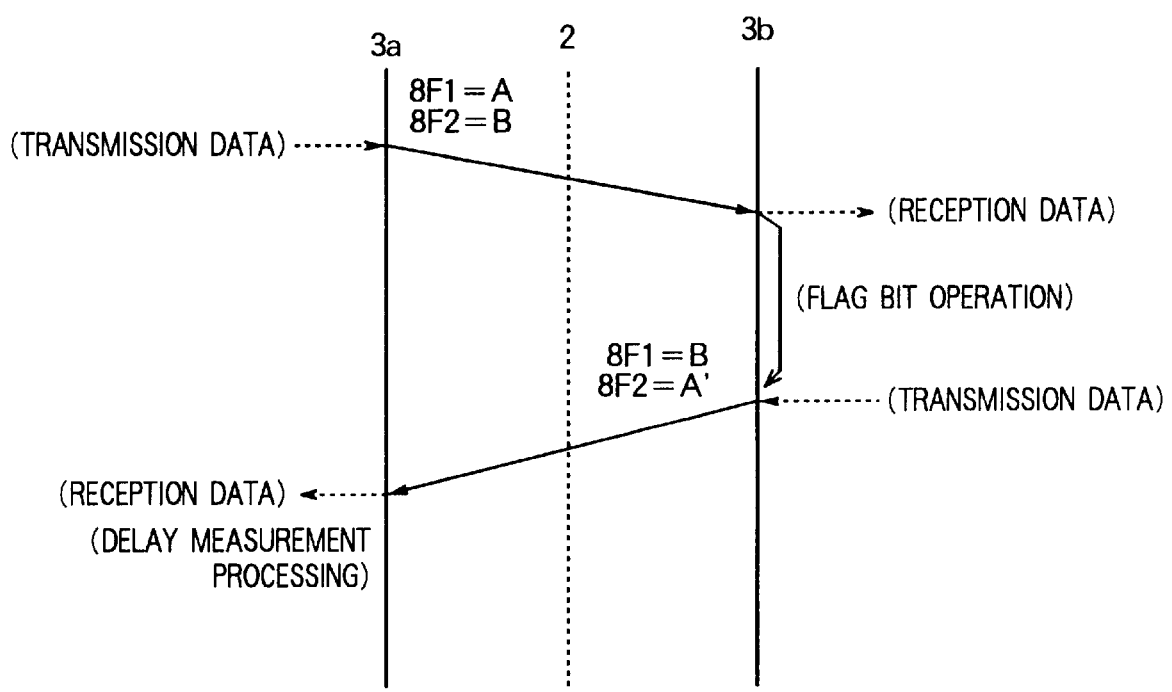
FIG. 6 is a view of the processing of the data transmitting apparatus in a range a shown in FIG. 5.

FIG. 6 is a view of the processing of the data transmitting apparatuses 3a and 3b within the range a shown in FIG. 5.

FIG. 7A and FIG. 7B are views of the time difference between the bit 8F2 (bit B) transmitted from the data transmitting apparatus 3a shown in FIG. 2 and the bit 8F2 (bit B) returned by the data transmitting apparatus 3a.

Figure 8:
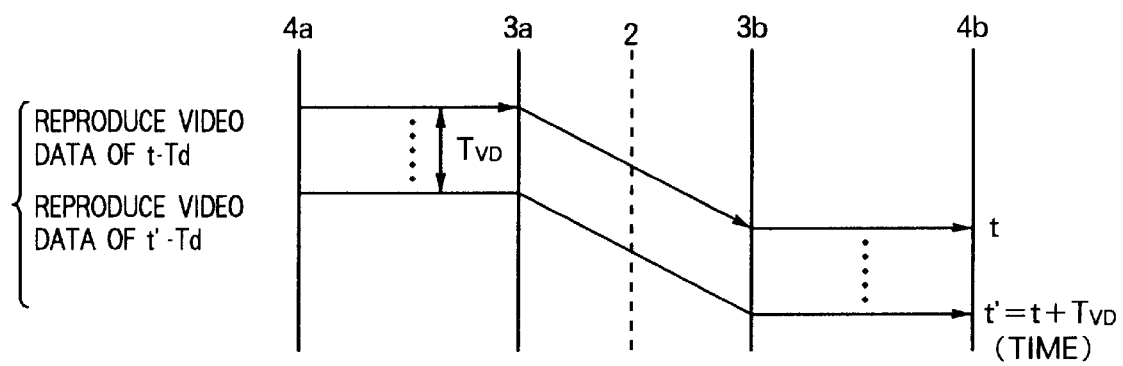
FIG. 8 is a view explaining compensation (advance control) of the transmission delay time between the data transmitting apparatuses shown in FIG. 2.

FIG. 8 is a view explaining the compensation (advance control) of the transmission delay time between the data transmitting apparatuses 3a and 3b shown in FIG. 2.

First, the data transmitting apparatus 3a measures the transmission delay time Td.

As shown in the range a of FIG. 5, the PDU packet is mutually transmitted between the data transmitting apparatuses 3a and 3b.

The bits 8F1 and 8F2 (FIG. 3) are contained in the PDU packet as mentioned above. The data transmitting apparatus 3a places the bit B generated by the data transmitting apparatus 3a per se in the bit 8F2, multiplexes this in the PDU packet, and transmits the same via the ATM communication line 2 to the data transmitting apparatus 3b.

The data transmitting apparatus 3b receives the PDU packet from the data transmitting apparatus 3a via the ATM communication line 2 and demultiplexes the PDU packet to the transmission data (audio and video data) and the other data. Further, the data transmitting apparatus 3b multiplexes the transmission data, other data, and 8F2 (bit B) of the data demultiplexed from the transmission data from the data transmitting apparatus 3a on 8F1, multiplexes the bit A' generated by the data transmitting apparatus 3b per se on the bit 8F2 and generates the PDU packet, and returns the received bit 8F2 as the new bit 8F1 with respect to the data transmitting apparatus 3a (flag bit operation shown in FIG. 6).

Figure 7:
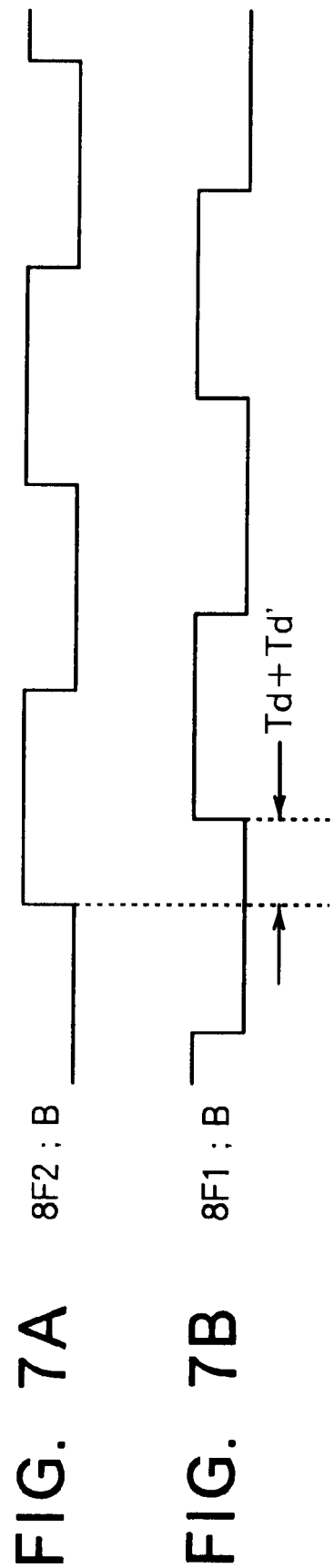
FIG. 7A and FIG. 7B are views of the time difference between a bit 8F2 transmitted from a data transmitting apparatus (3a) shown in FIG. 2 and the bit 8F2 returned by a data transmitting apparatus (3b)

As shown in FIG. 7, the data transmitting apparatus 3a detects a time difference Td+Td' between the bit 8F1 returned by the data transmitting apparatus 3b and the bit 8F2 transmitted with respect to the data transmitting apparatus 3b. This time difference Td+Td' is the sum of the transmission delay time Td (FIG. 5) when transmitting the PDU packet from the data transmitting apparatus 3a to the data transmitting apparatus 3b and the transmission delay time Td' when performing the transmission in the inverse direction to this, but usually Td=Td', therefore the time difference (Td+Td')/2=transmission delay time Td can be considered. The data transmitting apparatus 3 calculates the time difference (Td+Td')/2 as the transmission delay time Td, controls the VTR device 14a based on the transmission delay time Td, and generates the data LNID2 and LN2 (FIG. 3) (delay measurement processing shown in FIG. 6).

As shown in FIG. 5, when the advance reproduction request signal is transmitted from the data transmitting apparatus 3b to the data transmitting apparatus 3a via the ATM communication line 2, the data transmitting apparatus 3a controls the VTR device 14a as shown in FIG. 8 to reproduce the audio and video data which should be processed at the time t in the data transmitting apparatus 3b at the time t−Td, multiplexes the generated other data such as LNID2 and LN2 in the PDU packet, and transmits the same to the data transmitting apparatus 3b. Below, until the reproduction time $T_{VD}$ elapses, the data transmitting apparatus 3a performs the transmission of the data by the advance control.

Figure 9:
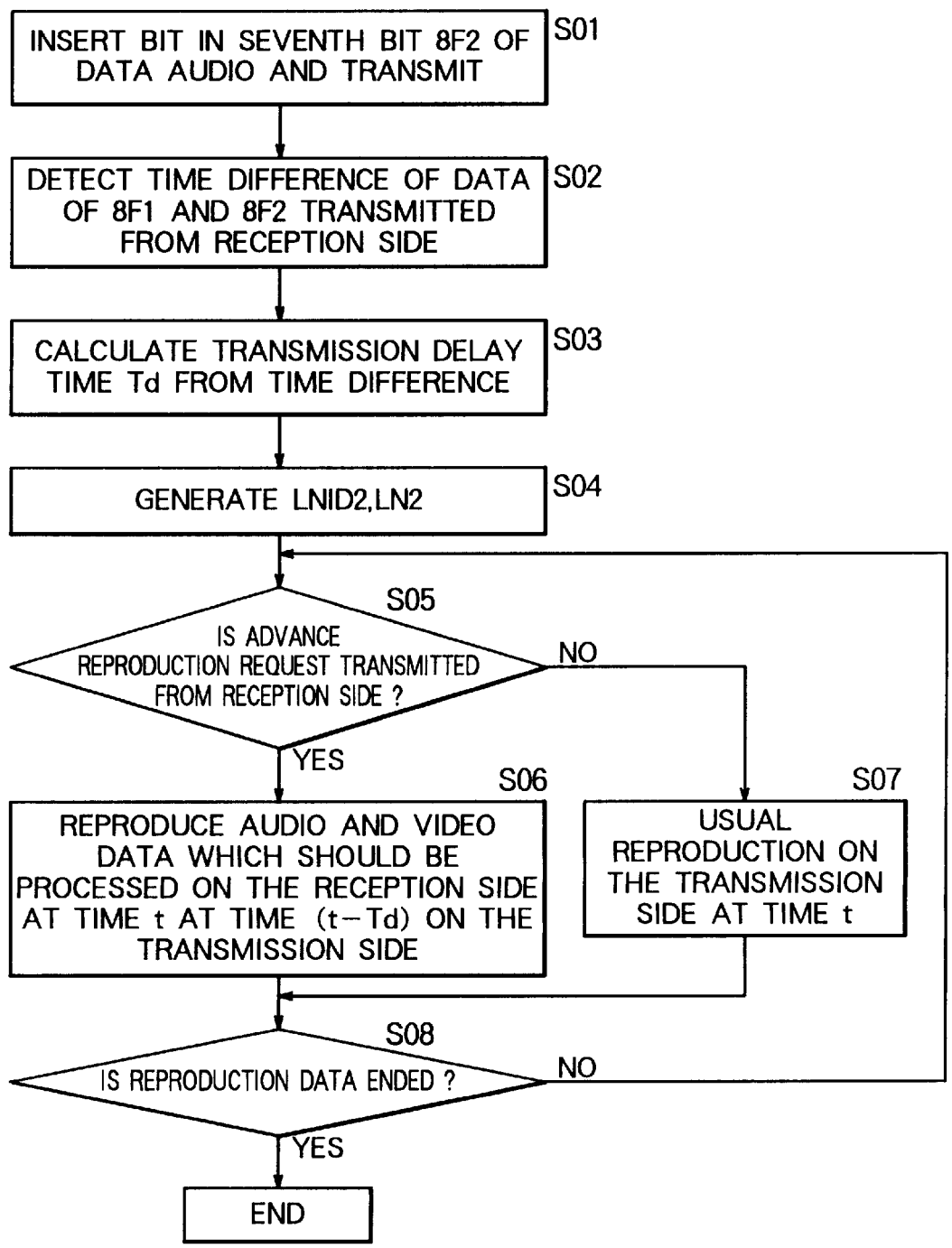
FIG. 9 is a flowchart of the processing for controlling a VTR device to perform the advance control by the data transmitting apparatus on the transmission side.

The content of the processing in the advance control will be further explained referring to FIG. 9.

FIG. 9 is a flowchart of the processing for controlling the VTR device 14 by the data transmitting apparatus 3 on the transmission side so as to perform the advance control.

As shown in FIG. 9, at step 01 (S01), the data transmitting apparatus 3 on the transmission side (or reception side) inserts a value in the seventh bit (8F2) of the data VOICE (FIG. 3) and transmits the same.

At step 02 (S02), the data transmitting apparatus 3 on the transmission side detects the time difference of the bits 8F1 and 8F2 returned by the data transmitting apparatus 3 on the reception side (or transmission side).

At step 03 (S03), the data transmitting apparatus 3 on the transmission side measures (calculates) the transmission delay time $T_d$ given by the ATM communication line 2 or the like to the transmission data based on the detected time difference.

At step 04 (S04), the data transmitting apparatus 3 on the transmission side generates the data LNID2 and LN2.

At step 05 (S05), the data transmitting apparatus 3 on the transmission side decides whether or not an advance reproduction request is transmitted from the data transmitting apparatus 3 on the reception side. Where it is transmitted, the processing routine goes to the processing of S06, and where it has not been transmitted, the processing routine goes to the processing of S07.

At step 06 (S06), the data transmitting apparatus 3 on the transmission side controls the VTR device 14, makes the same reproduce the audio and video data which should be processed at the time t on the reception side at the time $(t-T_d)$, and transmits the same to the reception side.

At step 07 (S07), the data transmitting apparatus 3 on the transmission side controls the VTR device 14 to reproduce the audio and video data of the time t at the time t irrespective of the time at which the audio and video data should be processed on the reception side and transmits the same to the reception side.

At step 08 (S08), the data transmitting apparatus 3 on the transmission side decides whether or not the reproduction of the audio and video data (reproduction data) which should be reproduced by the VTR device 14 is terminated and terminates all processing where the reproduction of the reproduction data is terminated. The operation routine then goes to the processing of S05 where the reproduction of the reproduction data is terminated.

The advance control explained above is convenient where the data transmitting apparatus 3b is connected to a subsidiary adjustment apparatus of the television broadcasting station in place of the VTR device 14b, and the transmission data transmitted from the data transmitting apparatus 3a in real time is used as the material of the program or editing.

The advance control can be adapted to the transmission of various data for which the processing time on the reception side is determined in addition to audio and video data.

Further, in addition to the use of the bits 8F1 and 8F2, it is possible even if for example the transmission delay time Td between the data transmitting apparatuses 3a and 3b is preliminarily measured and the advance control is carried out based on this delay time Td.

Third Embodiment

Below, the configuration of the data transmitting apparatuses 3a to 3f will be explained as a third embodiment of the present invention.

Figure 10:
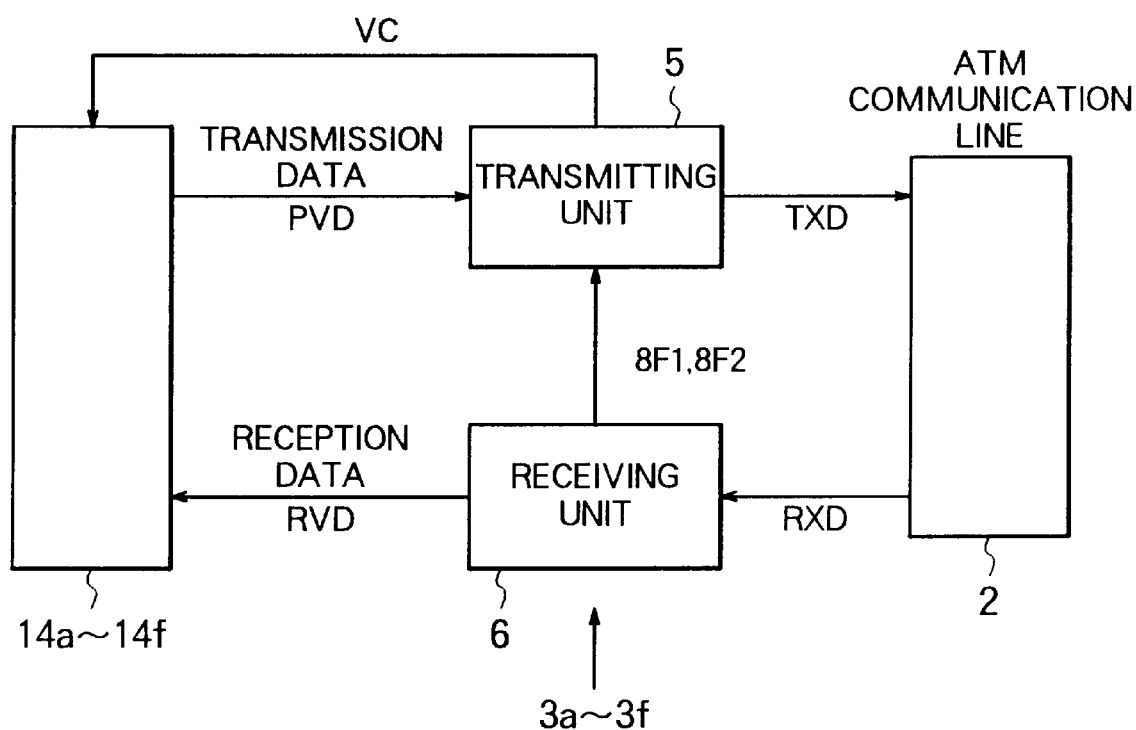
FIG. 10 is a view of the configuration of the data transmitting apparatus shown in FIG. 2 in a third embodiment.

FIG. 10 is a view of the configuration of the data transmitting apparatuses 3a to 3f shown in FIG. 2.

As shown in FIG. 10, the data transmitting apparatuses 3a to 3f are constituted by the transmitting unit 5 and the receiving unit 6, respectively, from the receiving unit 6 to the VTR devices 14a to 14f, the transmission data (reception data) RVD of the D2 system which is received by the receiving unit 6 and demultiplexed from the PDU packet is input, and the VTR devices 14a to 14f reproduce the data under the control of the transmitting unit 5 via the control signal VC and output the same as the transmission data PVD of the D2 system to the transmitting unit 5. Further, the bits 8F1 and 8F2 received by the receiving unit 6 are supplied from the receiving unit 6 to the transmitting unit 5.

Figure 11:
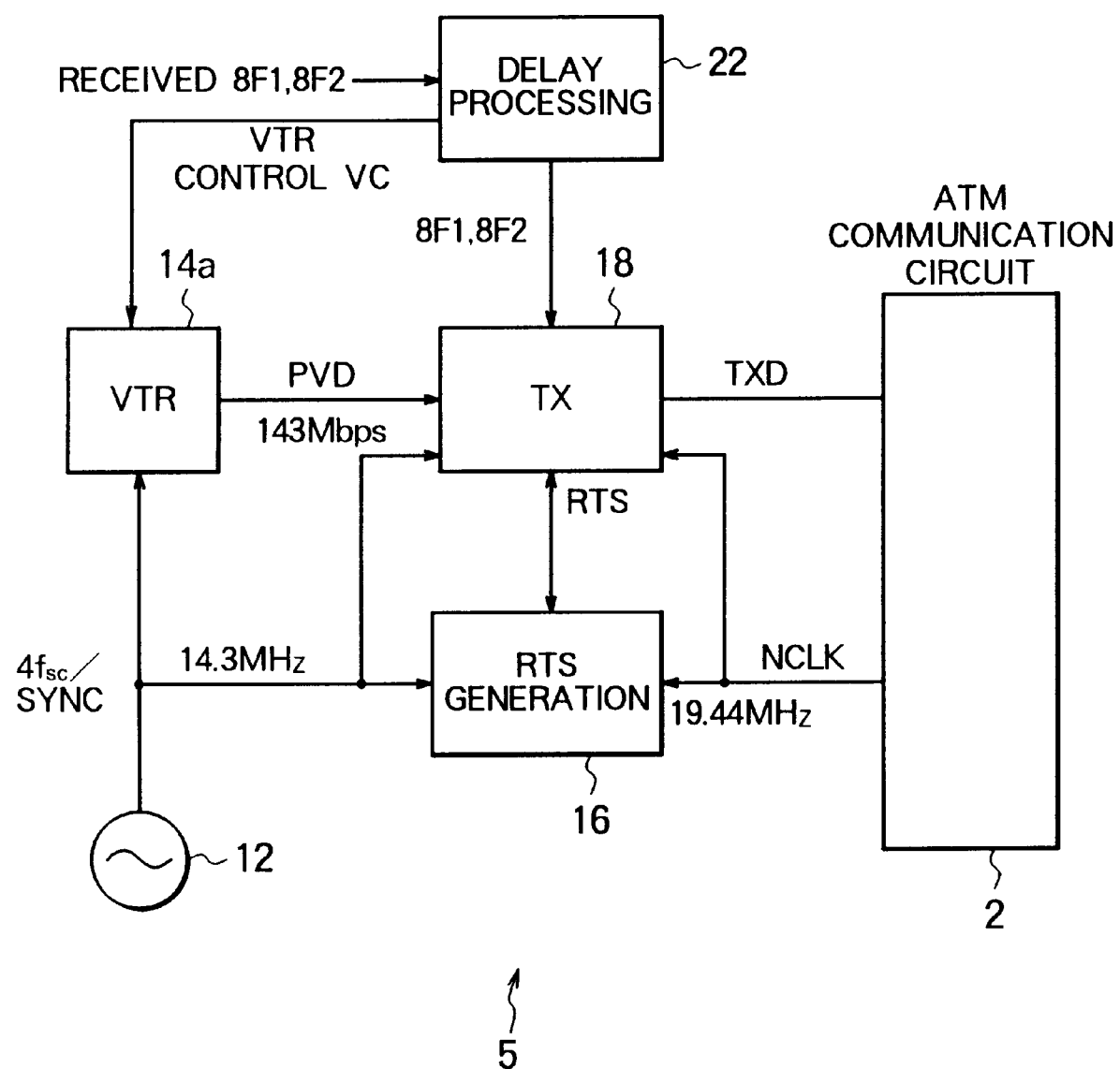
FIG. 11 is a view of the configuration of a transmitting unit shown in FIG. 10.

FIG. 11 is a view of the configuration of the transmitting unit 5 shown in FIG. 10.

As shown in FIG. 11, the transmitting unit 5 is constituted by a clock generating device 12, a digital video tape recorder (VTR) 14, an RTS generating device 16, a transmitting device (TX) 18, and a delay processing circuit 22.

The clock generating device 12 generates the internal clock $4f_{sc}$ of 14.3 MHz used in the transmitting unit 5 and a synchronization signal SYNC corresponding to the vertical synchronization signal of the video signal by using for example a crystal oscillator or the like and supplies the same to the VTR 14, RTS generating device 16, and the transmitting device 18.

The VTR 14 records and reproduces the digital audio and video data of the D2 standard in synchronization with the internal clock $4f_{sc}$ and outputs the same to the transmitting device 18 in the 143 Mbps serial format according to the SDI system or SDDI system (hereinafter described as the SDI system).

The RTS generating device 16 generates a synchronization data RTS (Residual Time Stamp) which indicates the actual whole number ratio of the frequency of the internal clock $4f_{sc}$ with respect to the frequency of the line clock NCLK supplied from the ATM communication line 2 and is used for the establishment of synchronization between the transmitting units 5 and 30.

The delay processing circuit 22 performs the delay measurement processing shown in FIG. 6 based on the bits 8F1 and 8F2 input from the receiving unit 6.

Figure 12:
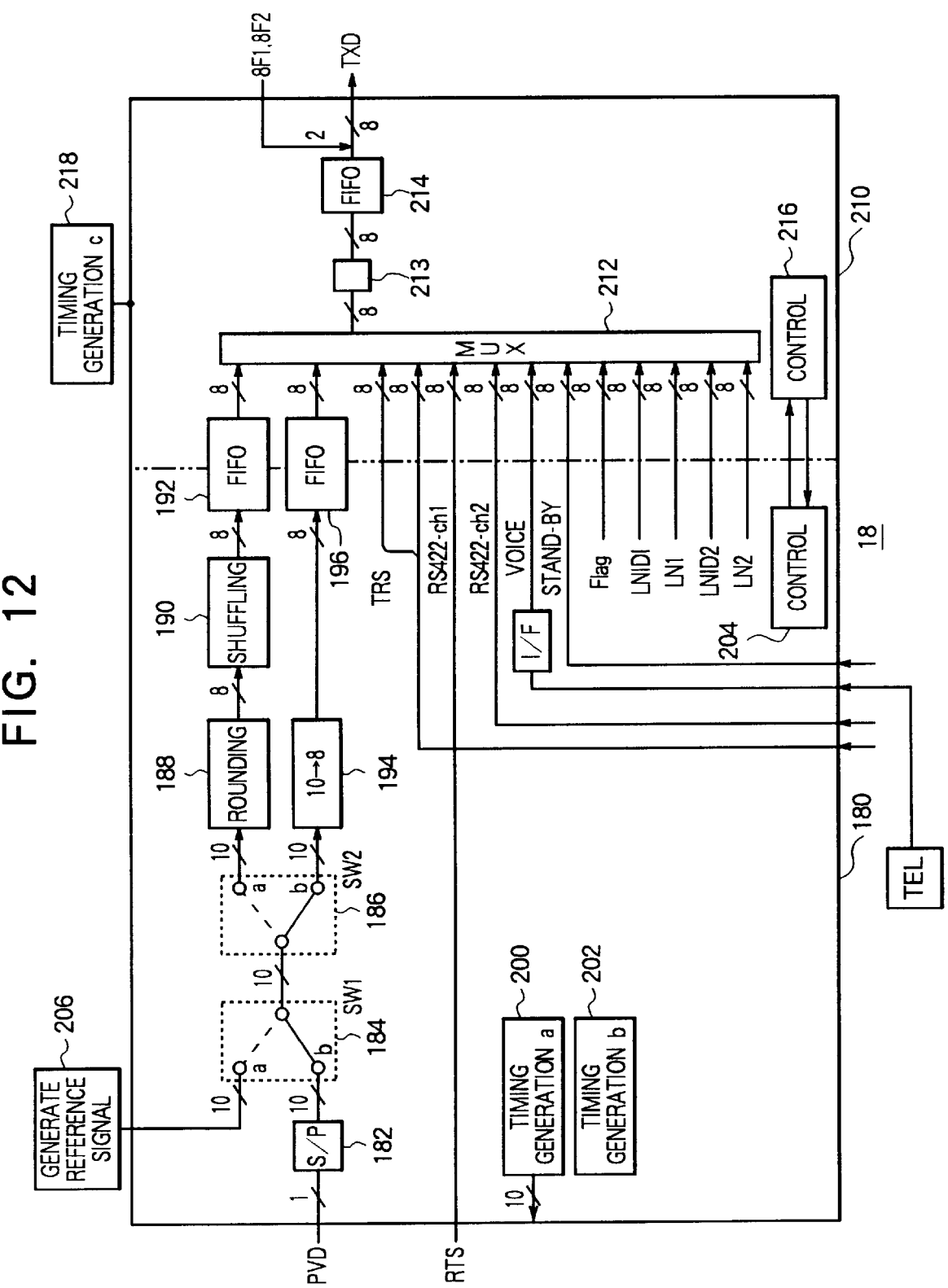
FIG. 12 is a view of the configuration of the transmitting apparatus shown in FIG. 11.

FIG. 12 is a view of the configuration of the transmitting device 18 shown in FIG. 11.

As shown in FIG. 12, the transmitting device 18 is constituted by a first block 180 operating in synchronization with the internal clock $4f_{sc}$ and a second block 210 operating in synchronization with the line clock NCLK.

The first block 180 is constituted by a serial/parallel converting circuit (S/P circuit) 182, a first switch circuit (SW1) 184, a second switch circuit (SW2) 186, a rounding circuit 188, a shuffling circuit 190, a first FIFO circuit 192, a word width converting circuit (10→8) 194, a second FIFO circuit 196, a timing generating circuit 200, a timing generating circuit b202, a control circuit 204, and a reference signal generating circuit 206.

The second block 210 is constituted by a multiplexing circuit (MUX) 212, a third FIFO circuit 214, a control circuit 216, and a timing generating circuit 218.

In the first block 180, the timing generating circuit 200 generates video data (black burst data) corresponding to a black burst at the operation timing based on the data RTS of the value where the data is not transmitted from the other data transmitting apparatuses 3a to 3f (default).

The reference signal generating circuit 206 is a circuit on the outside of the first block 180 and generates black burst data similar to the timing generating circuit 200 and outputs the same to the terminal a of the switch circuit 184.

The S/P circuit 182 converts the transmission data of the SDI system of a 1 bit serial format input from the VTR device 14 to the 10-bit parallel format and outputs the same to the terminal b of the switch circuit 184.

The switch circuit 184 selects the terminal b side and outputs the output data of the S/P circuit 182 to the switch circuit 186 where the transmitting unit 5 transmits the data, and selects the terminal a side and outputs the black burst data output from the reference signal generating circuit 206 to the switch circuit 186 in cases other than this.

The switch circuit 186 selects the video data part in the audio and video data of the D2 system shown in FIG. 4 among the output data (transmission data) of the S/P circuit 182 selected by the switch circuit 184 and outputs the same to the rounding circuit 188 and selects the ancillary data portion and outputs the same to the word width converting circuit 194.

The rounding circuit 188 converts the data (video data) corresponding to the video data portion shown in FIG. 4 to the data of an 8-bit parallel format, rounds the same, and outputs it to the shuffling circuit 190. Note that, the header data shown in FIG. 4 is handled by the control circuit 204.

The shuffling circuit 190 rearranges the 8-bit parallel signals input from the rounding circuit 188 to the order by which interpolation can be easily carried out where a data error occurs in the ATM communication line 2 and outputs the same to the FIFO circuit 192.

The word width converting circuit 194 converts the data (audio data) corresponding to the ancillary data portion input from the switch circuit 186 shown in FIG. 4 to an 8-bit parallel format and outputs the same to the FIFO circuit 196.

The FIFO circuits 192 and 194 read the data in synchronization with the internal clock $4f_{sc}$ and sequentially output the data in synchronization with the line clock NCLK and receive the data from the first block 180 and transfer the data to the second block 210.

The control circuits 204 and 216 monitor the addresses at which the data is written and the addresses at which the data is read out in the FIFO circuits 192 and 194, respectively, and perform the control of these addresses.

Further, the first block 180 generates the data LN1, LNID1, LN2, and LNID2 and data Flag (FIG. 3) based on the bits 8F1 and 8F2 and outputs the same to the second block 210.

In the second block 210, the timing generating circuit 218 controls the operation timing of the second block 210 based on the line clock NCLK.

To the multiplexing circuit 212 is input the data RTS from the RTS generating device 16 and is input the data LN1, LNID1, LN2, LNID2, and Flag from the first block 180. The multiplexing circuit 212 multiplexes these data and the audio data and video data input from the FIFO circuits 192 and 196 and outputs the same to the FIFO circuit 214.

The CRCC addition circuit 213 calculates each data CRCC, adds this, and outputs the same to the FIFO circuit 214.

The FIFO circuit 214 buffers the output data of the multiplexing circuit 212 and outputs the same as the transmission data TXD to the ATM communication line 2. Note that, as indicated in the figure, the bits 8F1 and 8F2 from the delay processing circuit 22 are further added to the output data of the FIFO circuit 214 which becomes the transmission data TXD.

Figure 13:
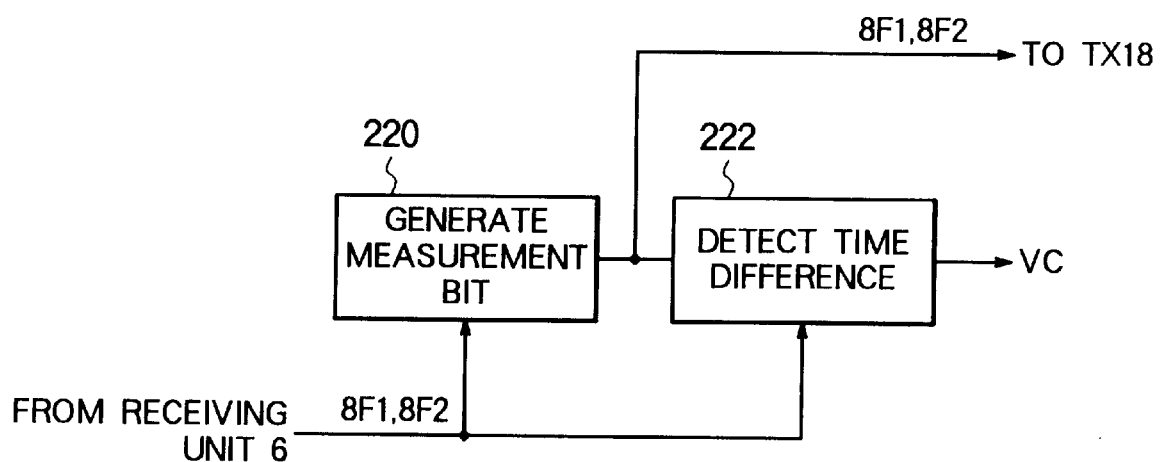
FIG. 13 is a view of the configuration of a delay processing circuit shown in FIG. 11.

FIG. 13 is a view of the configuration of the delay processing circuit 22 shown in FIG. 11.

As shown in FIG. 13, the delay processing circuit 22 is constituted by a measurement bit generating circuit 220 and a time difference detecting circuit.

The measurement bit generating circuit 220 generates the bit 8F2 shown in FIG. 3 and sends back the bit 8F2 received by the receiving unit 6 to the bit 8F1.

The time difference detecting circuit 222 detects the time difference between the bit 8F1 received by the receiving unit 6 and the bit 8F2 generated by the measurement bit generating circuit 220 as shown in FIG. 7, calculates the transmission delay time Td, controls the VTR device 14 via the control signal VC, and performs the advance control.

Figure 14:
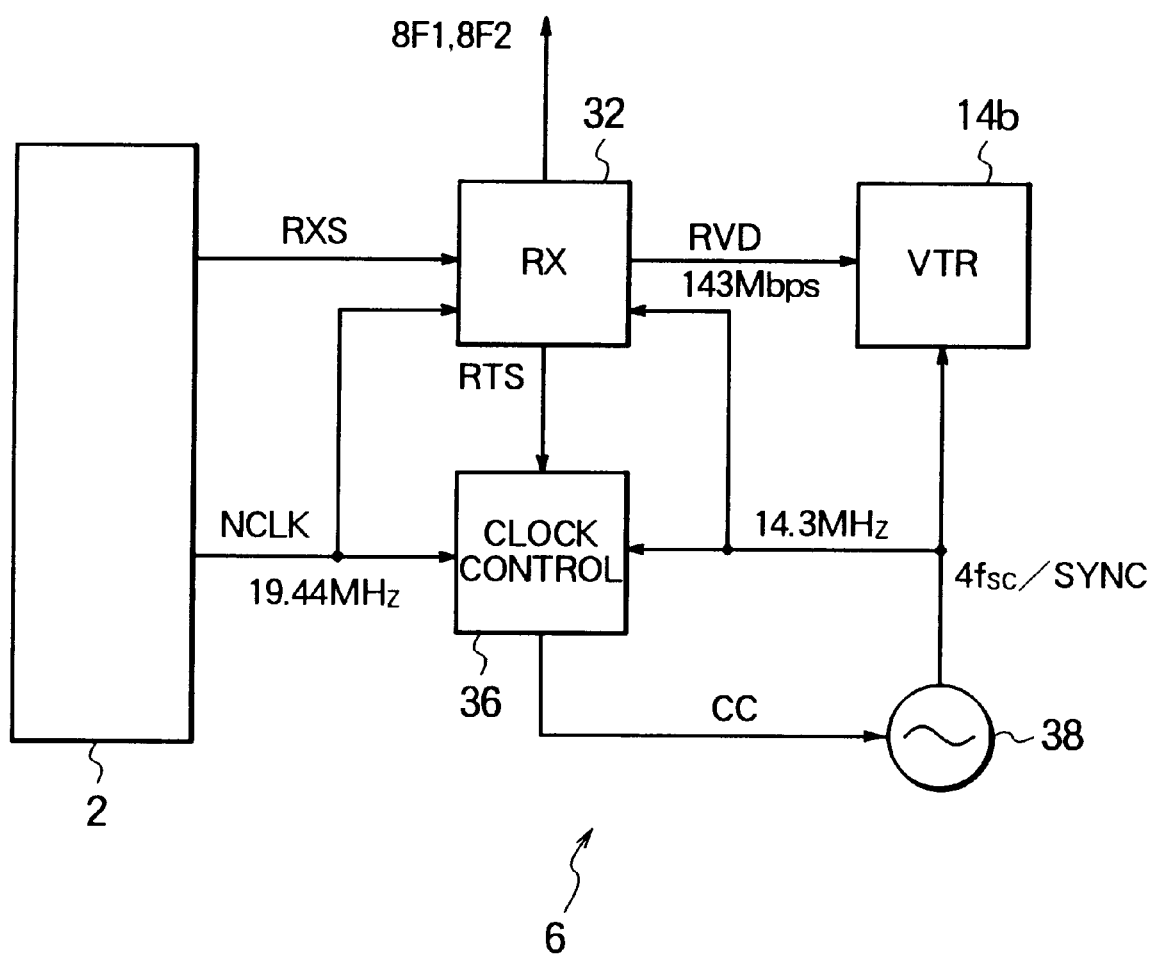
FIG. 14 is a view of the configuration of a receiving unit shown in FIG. 10.

FIG. 14 is a view of the configuration of the receiving unit 6 shown in FIG. 10.

As shown in FIG. 14, the receiving unit 6 is constituted by a receiving-device (RX) 32, a VTR 14b, a clock control device 36, and a clock generating device 38, receives the PDU packet transmitted from the data transmitting apparatus 3 of the transmission side, reproduces the internal clock $4f_{sc}$ in synchronization with the internal clock $4f_{sc}$ of the data transmitting apparatus 3 on the transmission side based on the synchronization data RTS and the line clock NCLK, demultiplexes the audio and video data (transmission data) from the PDU packet, and records the same.

Figure 15:
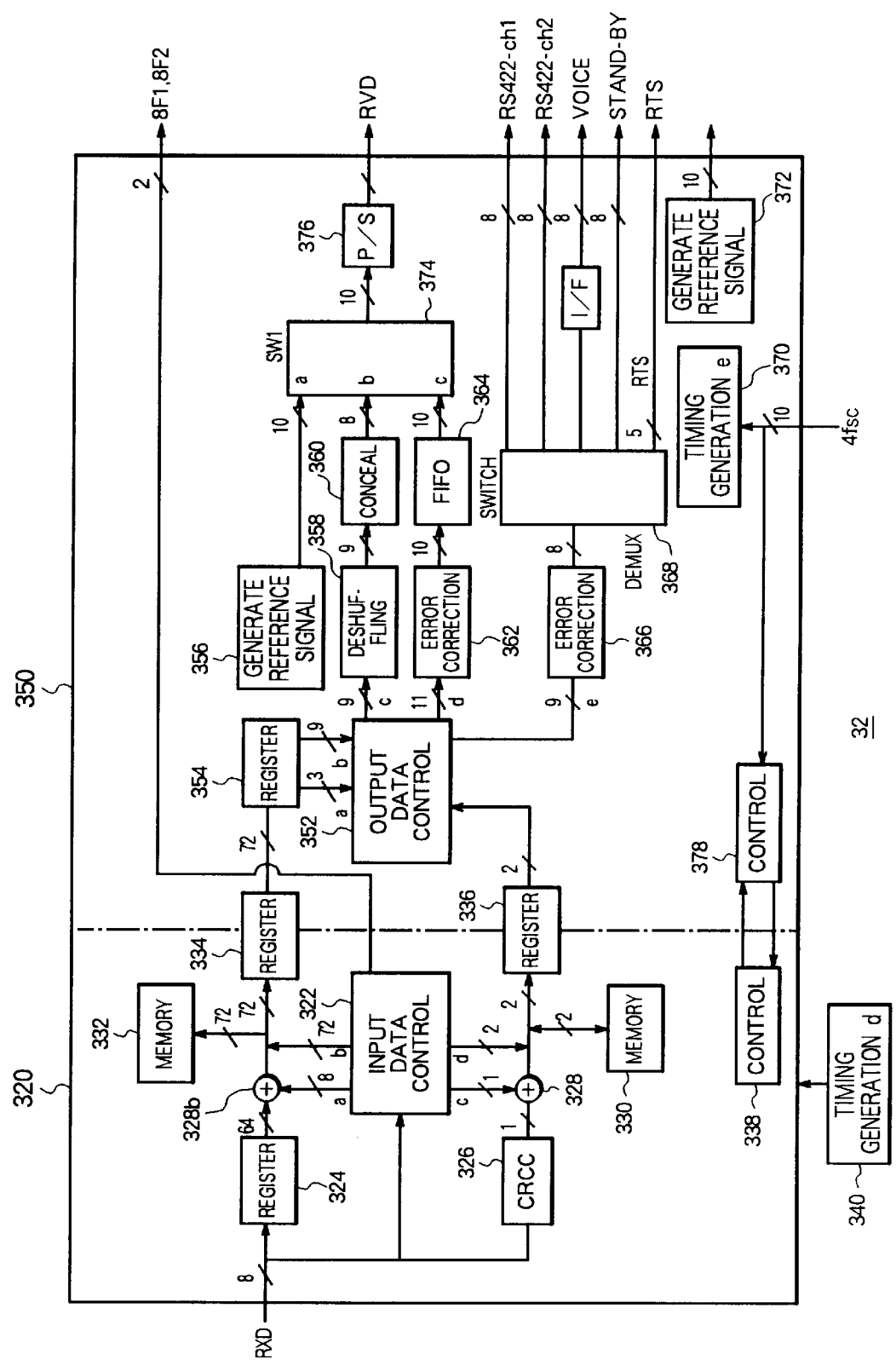
FIG. 15 is a view of the configuration of a receiving apparatus shown in FIG. 14.

FIG. 15 is a view of the configuration of the receiving device 32 shown in FIG. 14.

As shown in FIG. 15, the receiving device 32 is constituted by a first block 320 operating in synchronization with the line clock NCLK and a second block 350 operating in synchronization with the internal clock $4f_{sc}$, demultiplexes each data and transmission data from the PDU packet received from the ATM communication line 2 as the reception data RXD, outputs the transmission data among the demultiplexed data to the VTR device 14 as the reception data RVD, and outputs the bits 8F1 and 8F2 to the delay processing circuit 22 of the transmitting unit 5.

The first block 320 is constituted by an input data control circuit 322, a first register circuit 324, a CRCC calculating circuit 326, adder circuits 328a and 328b, a first memory circuit 330, a second memory circuit 332, a second register circuit 334, a third register circuit 336, a control circuit 338, and a timing generating circuit 340.

The second block 350 is constituted by an output data control circuit 352, a fourth register 354, a first reference signal generating circuit 356, a deshuffling circuit 358, a concealing circuit 360, a first error correcting circuit 362, an FIFO circuit 364, a second error correcting circuit 366, a switch circuit 368, a timing generating circuit 370, a second reference signal generating circuit 372, a switch circuit 374, a parallel/serial converting circuit (P/S circuit) 376, and a control circuit 378.

The PDU packet received by the receiving device 32 from the ATM communication line 2 is input to the input data control circuit 322, the first register circuit 324, and the CRCC calculating circuit 326.

The first register circuit 324 converts the received PDU packet of the 8 bit-parallel format to a 64 bit-parallel format.

The CRCC calculating circuit 326 performs the calculation processing regarding each data CRCC (FIG. 3) contained in the PDU packet and outputs the result of calculation to the adder circuit 328a. Note that, the CRCC calculating circuit 326 divides the transmission data $X^n+X^{n-1}+X^{n-2}+\ldots+X+1$ by $G(X)=X^{14}+X^2+X+1$, detects an error where the remainder of this is other than 0, makes the result of calculation the logical value 1, and outputs the same.

The input data control circuit 322 generates the write flag data (a: 8 bit-parallel data in which all bits are logical value 0, and each bit corresponding to one byte of the PDU packet) based on each data contained in the input PDU packet and outputs the same to the adder circuit 328b. The adder circuit 328b adds the write flag data to the output data of the first register circuit 324, converts the same to a 72-bit width, and outputs this.

Further, the input data control circuit 322 generates the read flag data (b) having a 9 bit×8 word configuration. The input data control circuit 322 reads the read flag data and then makes only the parity bit the logical value 1, makes all other bits the logical value 0, and writes the same in the memory circuit 332 having an address space of a line number (525)×packet length of PDU packet×9 bits.

In this way, the input data control circuit 322 performs the bit operation of the read flag data because where the read flag data of the read data has a logical value 1, it is decided that the required data has not arrived. Note that, when it has been written before the data is read, the read flag data becomes the logical value 0.

The register circuit 334 reads eight series of data together, each series of data consisting of 9 bits in total, i.e., the 8 bits of reception data and one bit of flag data corresponding to the reception data from the memory circuit 332, as the data of 72 bits in synchronization with the line clock NCLK, and outputs the same to the register 354 in synchronization with the internal clock $4f_{sc}$.

Further, the input data control circuit 322 outputs the write flag data to the adder circuit 328a (c). The adder circuit 328a adds the write flag data to the result of calculation of the CRCC calculating circuit 326 and returns the same to the input data control circuit 322. The input data control circuit 322 stores the calculation result to which this write flag data is added in the memory circuit 330 (d).

The register circuit 336 reads the result of addition of the adder circuit 328a stored in the memory circuit 332 in synchronization with the line clock NCLK and outputs the same in synchronization with the internal clock $4f_{sc}$.

The control circuits 338 and 378 manage the write addresses and read addresses of the register circuits 334 and 336 similar to the control circuits 204 and 216 (FIG. 12) of the transmitting device 18.

In the second block 350, the timing generating circuit 370 controls the operation timing of the portions of the second block 350 based on the internal clock $4f_{sc}$.

The reference signal generating circuit 372 generates the reference signal and outputs this.

The reference signal generating circuit 356 generates the reference signal and outputs the same to the terminal a of the switch circuit 374.

Note that, the reference signals generated by the reference signal generating circuits 372 and 356 are signals which do not contain video data and ancillary data and which make the screen black after reproduction.

The data output from the register circuit 334 is input to the register 354. On the other hand, the data output from the register circuit 336 is input to the output data control circuit 352.

The register circuit 354 breaks down each word of the data corresponding to the ancillary data portion shown in FIG. 4 (audio data multiplexed in the ancillary region shown in FIG. 3) to the lower significant 2 bits and the parity bits thereof (a) and the upper significant 8 bits (b) and the parity bits thereof and outputs the same to the input data control circuit 322.

The output data control circuit 352 outputs the data corresponding to the video data portion shown in FIG. 4 (video data multiplexed in the video data region shown in FIG. 3) and the parity thereof to the deshuffling circuit 358 (c), outputs the data corresponding to the ancillary data portion shown in FIG. 4 (audio data multiplexed in the ancillary data region shown in FIG. 3) and the parity thereof to the error correcting circuit 362 (d), and outputs the data RS422-ch1, RS422-ch2, VOICE, RTS, and the stand-by data shown in FIG. 3 to the error correcting circuit 366 (e). That is, the output data control circuit 352 plays the part of a demultiplexing circuit for demultiplexing the audio data and video data and the data RS422-ch1 from the PDU packet too.

The output data control circuit 352 newly outputs the logical value 1 as the flag data where either one of the values of equations (2), (4), (5), and (6) among the data of a: 2 bits data (1)+flag data (2), b: 8 bits (3)+flag data (4), output of register 2=CRCC1 bit (5)+flag data (6), is the logical value 1 by this processing.

That is, the output data control circuit 352 converts the width of a: (reception data 8 bits+flag data 1 bit) of 2 words with the flag so that the format becomes ancillary data 10 bits+flag data 1 bit.

The deshuffling circuit 358 performs processing corresponding to the shuffling circuit 190 shown in FIG. 12 based on the data LNID2 and LN2 contained in the input data to return the same to the original order and outputs the resultant data to the concealing circuit 360.

The concealing circuit 360 performs the interpolation of the data for the data of for example a pixel in which a data error occurs by a method such as interpolation using peripheral pixels and outputs the result to the terminal b of the switch circuit 374.

The error correcting circuit 362 performs the error correction with respect to the input audio data and outputs the corrected data to the FIFO circuit 364.

The FIFO circuit 364 matches the timings of the video data output from the concealing circuit 360 and the data output from the error correcting circuit 362 and outputs the resultant data to the terminal c of the switch circuit 374.

The switch circuit 374 selects either of the reference signal from the reference signal generating circuit 356, the output data of the concealing circuit 360, or the output signal of the FIFO circuit 364, which are respectively input to the terminals a to c, in an order adapted to the audio and video data of the D2 system in the SDI system and outputs the selected data to the P/S circuit 376.

The P/S circuit 376 converts the data input from the switch circuit 374 to the data of serial format, and outputs the same to the VTR device 14 in synchronization with the internal clock $4f_{sc}$.

The error correcting circuit 366 performs the error correction with respect to the input data such as the data RS422-ch1 and outputs the result to the switch circuit 368.

The switch circuit 368 demultiplexes the error-corrected data and outputs the same as the data RS422-ch1, RS422-ch2, VOICE, RTS, and stand-by data, respectively.

The VTR device 14 (FIG. 14) records the audio and video data RVD input from the P/S converting circuit 330 in synchronization with the internal clock $4f_{sc}$.

The clock generating device 38 is a voltage controlled oscillating circuit having for example a crystal oscillating circuit, generates the internal clock $4f_{sc}$ of a frequency in accordance with the control of the clock control device 36 via the clock control signal CC, and supplies the same to the constituent portions of the receiving unit 6 of the data transmitting apparatus 3.

The clock control device 36 generates the clock control signal CC based on the synchronization data RTS input from the receiving device 32, brings the frequency of the internal clock $4f_{sc}$ generated by the clock generating device 38 into synchronization with the internal clock $4f_{sc}$ in the receiving unit 6 of the data transmitting apparatus 3b via this delay control signal CC, and further generates the synchronization signal SYNC such as the horizontal synchronization signal and vertical synchronization signal and supplies the same to the VTR device 14, etc.

Below, referring to FIG. 2 again, an explanation will be made of the operation of the data transmitting apparatus 1 by taking as an example a case where the data is transmitted between the data transmitting apparatuses 3a and 3b using the transmitting unit 5 and the receiving unit 6 shown in the third embodiment.

In the data transmitting apparatus 3a, the VTR device 14a of the transmitting unit 5 reproduces the audio and video data of the D2 system and outputs the same as the audio and video data PVD of the 143 Mbps serial format to the transmitting device 18.

On the other hand, the RTS generating device 16 generates the synchronization data RTS indicating the number of cycles of internal clock $4f_{sc}$ which enter during 1188 cycles of the line clock NCLK based on the internal clock $4f_{sc}$ generated by the clock generating device 12 and the line clock NCLK supplied by the ATM communication line 2 and sequentially outputs the same to the transmitting device 18.

The transmitting device 18 multiplexes the transmission data PVD and synchronization data RTS in the PDU packet shown in FIG. 3 and transmits the same to the data transmitting apparatus 3b via the ATM communication line 2. Further, the transmitting device 18 performs the advance control shown in FIG. 8 with respect to the VTR device 14a according to need.

The ATM communication line 2 transmits the ATM cell transmitted from the data transmitting apparatus 3a to the data transmitting apparatus 3b and, at the same time, supplies the line clock NCLK to the data transmitting apparatus 3b.

In the data transmitting apparatus 3b, the PDU packet transmitted from the data transmitting apparatus 3a is received by the receiving device 32 of the receiving unit 6. The receiving device 32 outputs the reception data RVD corresponding to the transmission data PVD of the receiving unit 6 of the data transmitting apparatus 3a with respect to the VTR 14b and the VTR 14b records this.

The clock control device 36 generates the clock control signal CC for synchronizing the frequency of the internal clock $4f_{sc}$ generated by the clock generating device 38 with the internal clock $4f_{sc}$ in the receiving unit 6 of the data transmitting apparatus 3b based on the synchronization data RTS input from the receiving device 32, the internal clock $4f_{sc}$ supplied from the clock generating device 38, and the line clock NCLK supplied from the ATM communication line 2 and outputs the same to the clock generating device 38.

The clock generating device 38 generates the internal clock signal $4f_{sc}$ by a frequency in accordance with the clock control signal CC and supplies the same to the portions of the receiving unit 6 of the data transmitting apparatus 3b.

As explained above, according to the data transmitting system 1 of the present invention, the SDI system which has been widely used as infrastructure in television broadcasting stations etc. can be used as the interface of the VTR 14, and therefore the already existing equipment can be easily connected to the ATM communication line.

Note that, the circuit configuration etc. of the transmitting unit 5 and the receiving unit 6 shown in the above embodiments are examples. It is also possible to replace them by circuits which can realize an equivalent function.

Further, as the apparatuses connected to the transmitting unit 5 and the receiving unit 6, a VTR device was exemplified, but the apparatuses are not limited to this. It is possible even if an editing device, relaying device, or transmitting equipment for inputting and outputting the data by for example the SDI system is connected.

Further, the PDU packet shown in FIG. 3 is an example. The present invention can be adapted to a transmitting system using a transmission packet of another format.

Further, the data transmitting system 1, the transmitting unit 5, and the receiving unit 6 according to the present invention can be applied to either of the audio or video data or data for information processing in addition to the audio and video data.

Fourth Embodiment

Below, a fourth embodiment will be explained.

In the fourth embodiment, a data transmitting system 1 wherein the operation of the delay processing circuit 22 and VTR device 14 etc. is changed and even if the transmission delay time Td is not equal to Td', correct advance control is possible and, in addition, the contents of the processing regarding the transmission delay time measurement of the data transmitting apparatuses 3a and 3b are the same and the measurement of the transmission delay time is easy and will be explained by taking as an example a case where the transmission data is transmitted from the data transmitting apparatus 3b to the data transmitting apparatus 3a.

Figure 16:
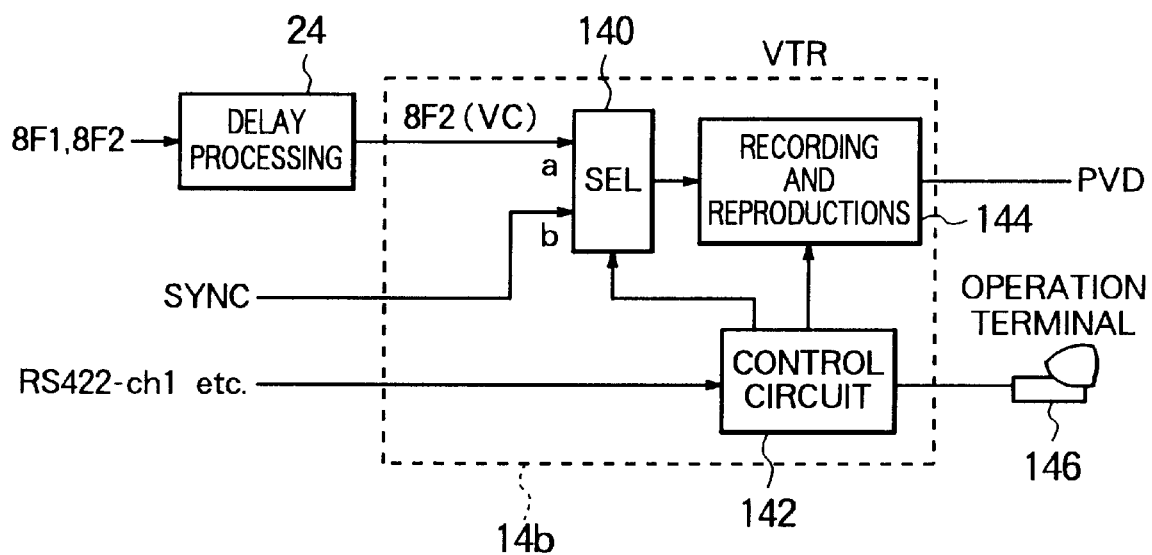
FIG. 16 is a view of the configuration of the VTR device (FIG. 2) in a fourth embodiment.

FIG. 16 is a view of the configuration of the VTR device 14b (FIG. 2) in the fourth embodiment. Note that, the VTR devices 14a and 14c to 14f have the same configuration.

As shown in FIG. 16, the VTR device 14a is constituted by a selecting circuit (SEL) 140, a control circuit 142, and a recording and reproducing device 144.

The delay processing circuit 24 is used in place of the delay processing circuit 22 shown in FIG. 11 in the transmitting unit 5 of the data transmitting apparatus 3b and outputs the bit 8F2 contained in the PDU packet as the control signal VC to the VTR device 14.

The control circuit 142 controls the recording and reproducing device 144 and the selecting circuit (SEL) 140 based on for example the data RS422-ch1 and RS422-ch2 shown in FIG. 3 or the operation data input from the operation terminal device 146. Concretely, the control circuit 142 controls the selecting circuit 140 so as to select the terminal a and supply the reference signal input from the delay processing circuit 24 to the recording and reproducing device 144 where the data RS422-ch1 etc. indicate the reproduction of the audio and video data based on the reference signal (bit 8F2) transmitted from the data transmitting apparatus 3a, while the control circuit 142 also controls the selecting circuit 140 to select the terminal b and input the synchronization signal SYNC generated by the clock generating device 38 to the recording and reproducing device 144 in a case other than this.

Figure 17:
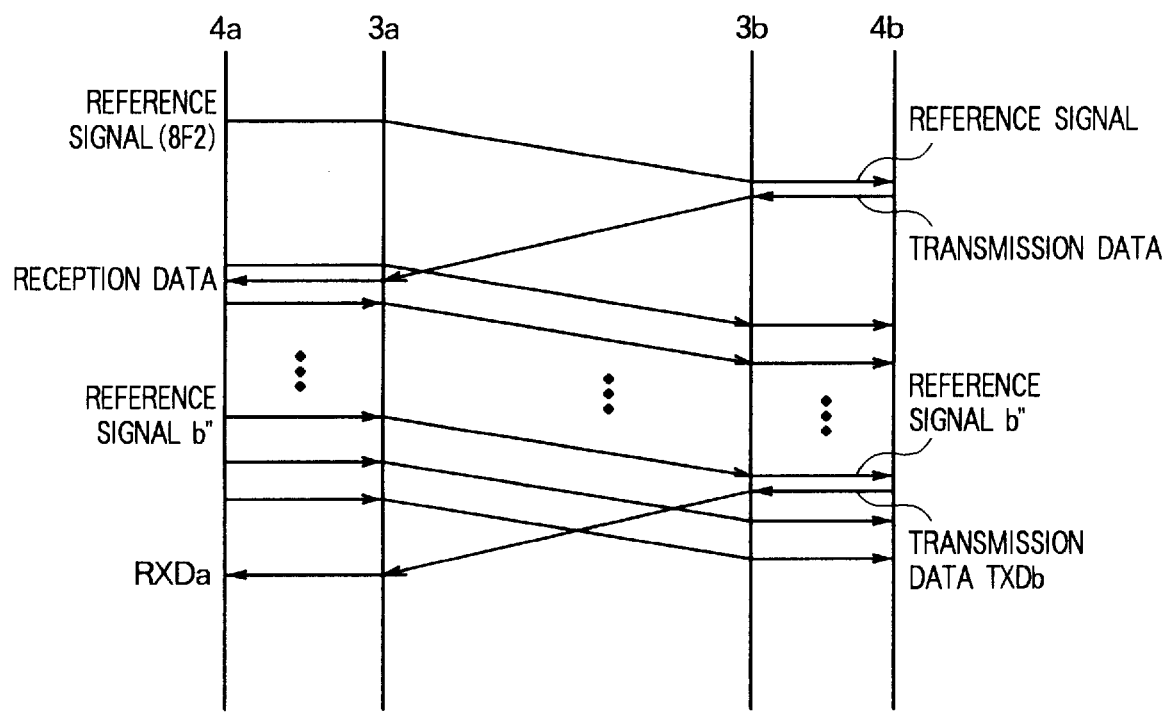
FIG. 17 is a view of the communication sequence between the data transmitting apparatuses to which the VTR device shown in FIG. 16 is applied.

FIG. 17 is a view of the communication sequence between the data transmitting apparatuses 3a and 3b (FIG. 2) to which the VTR devices 14a to 14f shown in FIG. 16 are applied.

FIG. 18A to FIG. 18E are timing charts of the transmission delay produced in each signal where the delay processing circuit 24 and the VTR devices 14a to 14f shown in FIG. 16 are used, in which FIG. 18A shows the reference signal b corresponding to the vertical synchronization signal used inside the data transmitting apparatus 3b; FIG. 18B shows a reference signal b'" (FIG. 17) transmitted from the data transmitting apparatus 3b to the data transmitting apparatus 3a as the bit 8F2 shown in FIG. 3; FIG. 18C shows the reference signal b" received by the data transmitting apparatus 3b; FIG. 18D shows the phase of the transmission data TXD output from the VTR device 14b to the data transmitting apparatus 3b; and FIG. 18E shows the reception data RXDa output from the data transmitting apparatus 3a to the VTR device 14a.

As shown in FIG. 17, the data transmitting apparatus 3a first multiplexes the reference signal a in the internal portion of for example the data transmitting apparatus 3a as the bit 8F2 of the PDU packet shown in FIG. 3 and outputs the same to the data transmitting apparatus 3b via the ATM communication line 2.

The data transmitting apparatus 3b takes out the bit 8F2 from the PDU packet, returns the same to the bit 8F1 and, at the same time, transmits the reference signal generated by the data transmitting apparatus 3b per se to the data transmitting apparatus 3a as a new bit 8F2.

In this way, by returning the received bit 8F2 as the bit 8F1 and transmitting the reference signal generated by itself to the opposite side as a new bit 8F2, the contents of the processing regarding the bits 8F2 and 8F1 of the data transmitting apparatuses 3a and 3b become the same. Note that, where the transmission and reception of the data have been already carried out before this, the transmission and reception of the first data of FIG. 17 are not necessary.

The delay processing circuit 22 of the transmitting unit 5 of the data transmitting apparatus 3a detects the time difference Td+Td' shown in FIG. 7 based on the bit 8F1 returned from the data transmitting apparatus 3b and the generated reference signal (bit 8F2).

Figure 18:
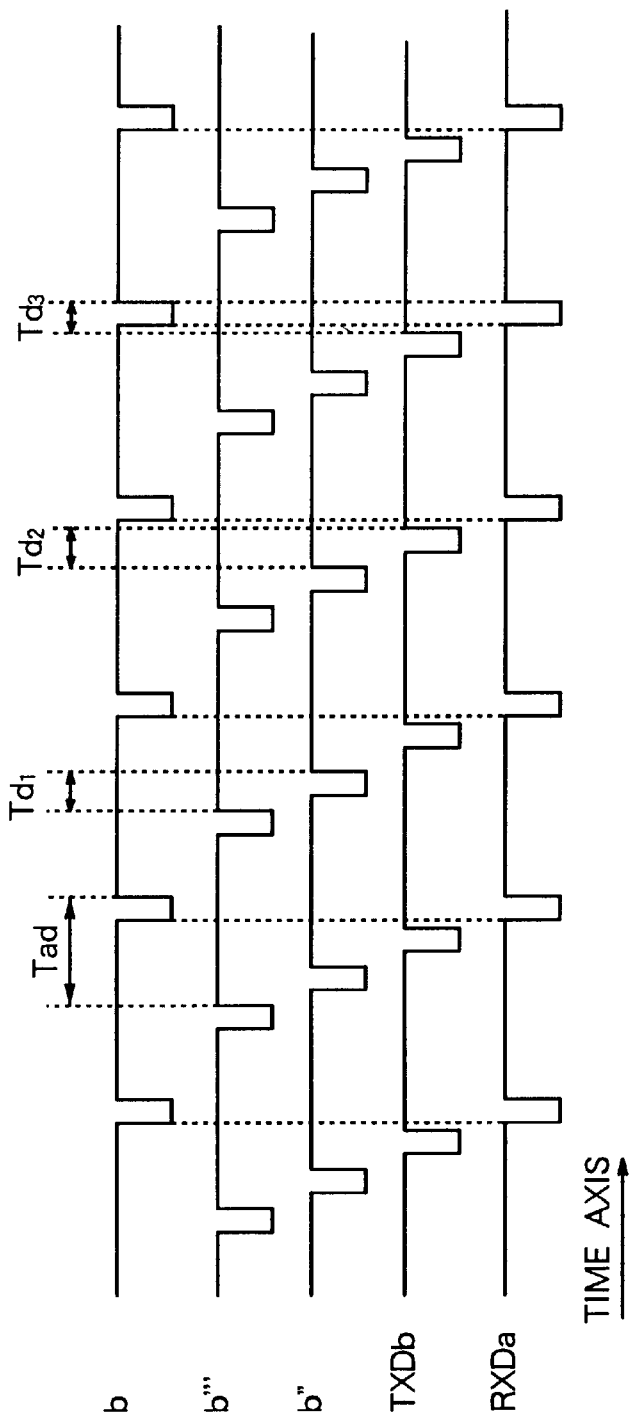
FIG. 18A to FIG. 18E are timing charts of the transmission delay produced in each signal where the delay processing circuit and VTR device shown in FIG. 16 are used.

The delay processing circuit 22 of the data transmitting apparatus 3a generates the reference signal b'" shown in FIG. 18(B) at a timing preceding in time the reference signal of the internal portion of the data transmitting apparatus 3a by exactly the time difference Td+Td' (=$T_{ad}$: FIG. 18). Further, the delay processing circuit 22 converts the received bit 8F2 to the bit 8F1 of a new PDU packet and outputs the reference signal b'" to the transmitting unit 5 as the data to be multiplexed on the bit 8F2 of the PDU packet.

The transmitting unit 5 of the data transmitting apparatus 3a multiplexes the reference signal b'" (bit 8F2) input from the delay processing circuit 22 and the transmission data etc. in the PDU packet and outputs the same to the data transmitting apparatus 3b.

The reference signal b'" is transmitted to the data transmitting apparatus 3b as the bit 8F2 receives the transmission delay $T_{d1}$ by the ATM communication line 2 and is received by the transmitting unit 5 of the data transmitting apparatus 3b at a timing of the reference signal b" shown in FIG. 18(C).

The transmitting unit 5 of the data transmitting apparatus 3b demultiplexes the reference signal (bit 8F2) from the PDU packet and outputs the same to the delay processing circuit 24.

The delay processing circuit 24 supplies the reference signal (bit 8F2) supplied from the receiving unit 6 as the control signal VC to the VTR device 14b. Further, the delay processing circuit 24 performs the bit operation regarding the bits 8F1 and 8F2 mentioned above.

The VTR device 14b reproduces the audio and video data at a timing indicated by the reference signal (bit 8F2) input from the delay processing circuit 24 and supplies the same to the transmitting unit 5 of the data transmitting apparatus 3b as the transmission data PVD.

The transmission data PVD is multiplexed in the PDU packet, further receives the transmission delay $T_{d2}$ inside the transmitting unit 5 as shown in FIG. 18(D) and becomes the transmission data TXDb, and is transmitted via the ATM communication line 2 to the data transmitting apparatus 3a. Note that, the transmission delay $T_{d2}$ is mainly derived from the shuffling processing etc.

The PDU packet transmitted from the data transmitting apparatus 3b to the ATM communication line 2 receives the transmission delay $T_{d3}$ as shown in FIG. 18(E) and is received by the receiving unit 6 of the data transmitting apparatus 3a as the reception data RXDa. As seen from a comparison of FIGS. 18(A) and 18(E), the reference signal b and the reception data RXDa inside the data transmitting apparatus 3a are synchronous to each other.

By constituting the delay processing circuit 24 and the VTR device 14b in this way, similar to the case shown in the second embodiment and the third embodiment, the data transmitting apparatus 3b transmits the transmission data to be processed at the time t in the data transmitting apparatus 3a while compensating for the transmission delay time and can make the transmission data reach the data transmitting apparatus 3 at the time t.

Further, even in a case where the transmission delay in a direction from the data transmitting apparatus 3a to the data transmitting apparatus 3b and the transmission delay in the inverse direction are different, the reception data RXDa can be correctly synchronized with the processing timing of the data transmitting apparatus 3a.

Note that, in the fourth embodiment, an explanation was made of the data transmission between the data transmitting apparatuses 3a and 3b, but a similar advance control is possible between any two among the data transmitting apparatuses 3a to 3f (FIG. 2).

Fifth Embodiment

Below, a fifth embodiment of the present invention will be explained.

Figure 19:
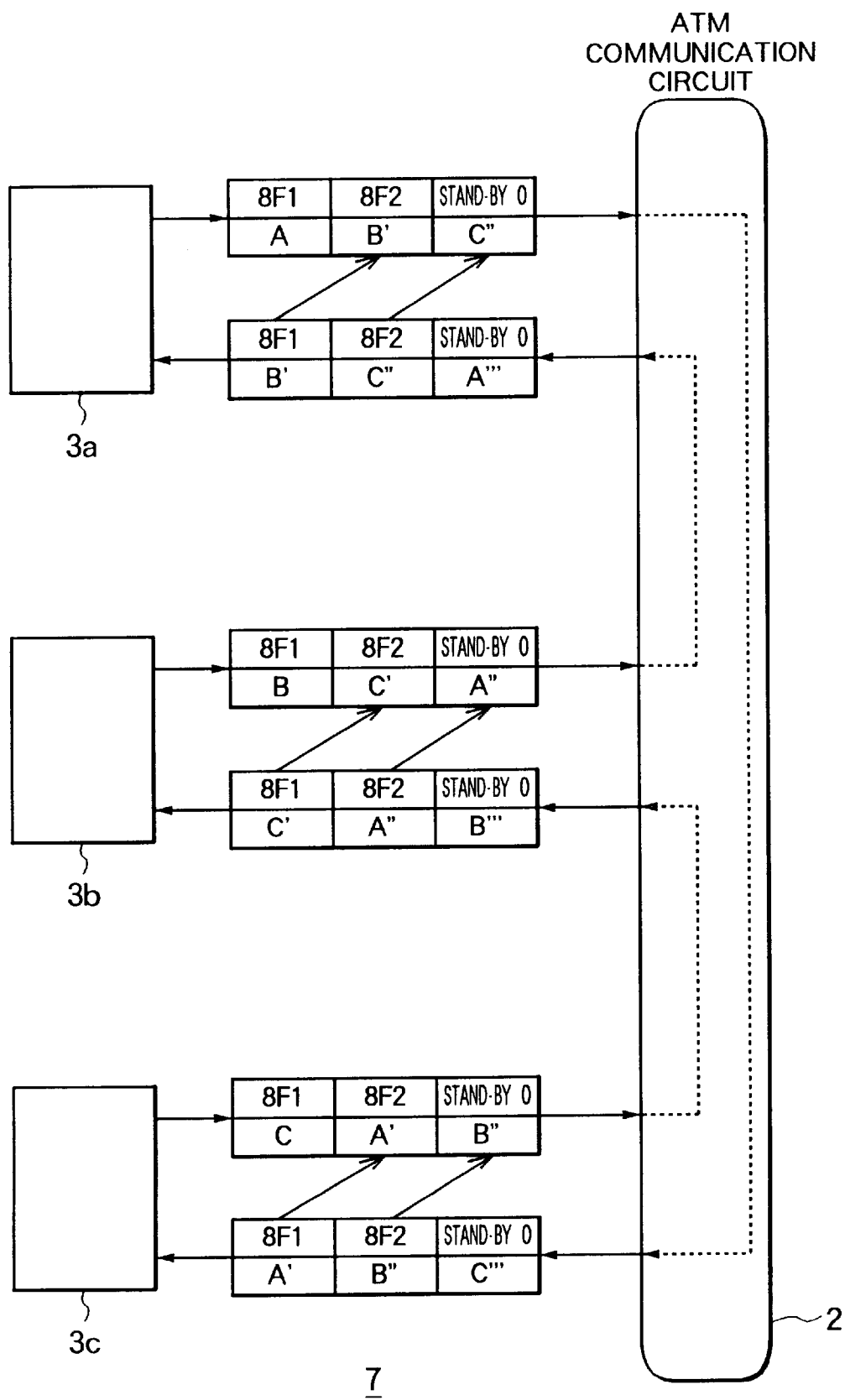
FIG. 19 is a view of the configuration of the data transmitting system according to the present invention in a fifth embodiment.

FIG. 19 is a view of the configuration of the data transmitting system 7 according to the present invention in the fifth embodiment.

As shown in FIG. 19, the data transmitting system 7 is constituted while being connected in the form of a daisy chain so that each of the data transmitting apparatuses 3a to 3f transmits the data with respect to only one other data transmitting apparatus 3 via the ATM communication line 2 and uses the bit 0 of the stand-by data of the PDU packet shown in FIG. 3 (hereinafter, described as stand-by 0) other than the bits 8F1 and 8F2 for the advance control.

In the fifth embodiment, each of the data transmitting apparatuses 3a and 3b performs the transmission of the reference data and the measurement of the transmission delay time by using the bits 8F1 and 8F2 and the stand-by 0 similar to the case shown in the fourth embodiment.

As shown in FIG. 19, the data transmitting apparatus 3a generates the reference signal A in synchronization with the synchronization signal in the internal portion and operates as the master, and the data transmitting apparatuses 3b and 3c generate the reference signals B and C which are independent from each other in synchronization with the reference signals C' and A' multiplexed on the bit 8F1 of the respectively received PDU packet.

The data transmitting apparatuses 3a to 3c multiplex the reference signals generated by the data transmitting apparatuses 3a to 3c on the bit 8F1 of the PDU packet, respectively, and shift the reference signals from the other data transmitting apparatuses 3, contained in the bits 8F1 and 8F2 of the received PDU packet to the bit 8F2 and the stand-by 0, respectively.

In this way, in the data transmitting system 7, the data transmitting apparatuses 3a to 3c all perform the same bit processing, thereby to perform the returning processing of the reference signals.

The data transmitting apparatus 3a can measure the transmission delay time between the data transmitting apparatus 3a and the data transmitting apparatus 3b after passing through the data transmitting apparatus 3c based on the generated reference signal A and the returned reference signal A''' from the data transmitting apparatus 3b and can measure the transmission delay time between the data transmitting apparatus 3a and the data transmitting apparatus 3c.

Similarly, the data transmitting apparatus 3b can measure the transmission delay time between the data transmitting apparatus 3a and the data transmitting apparatus 3b after passing through the data transmitting apparatus 3c based on the generated reference signal B and the returned reference signal B'''.

Further, similarly, the data transmitting apparatus 3c can measure the transmission delay time between the data transmitting apparatus 3a and the data transmitting apparatus 3c after passing through the data transmitting apparatus 3b based on the generated reference signal C and the returned reference signal C'''.

Note that, FIG. 19 exemplifies a case where the number of the data transmitting apparatuses 3 constituting the data transmitting system 7 is three, but the data transmitting system 7 can be constituted while further increasing the number of the daisy transmitting apparatuses 3 so far as it is connected to the daisy chain form. Note, where the number is increased, it is necessary to increase the number of the data bits to be used for the advance control according to the number of the apparatuses. Further, it is possible for any of the data transmitting apparatuses 3a to 3c to be regarded as the master.

Further, in the data transmitting system 7 in the fifth embodiment, the data transmitting apparatus 3a was regarded as the master, but the master in the fifth embodiment means an apparatus which gives a timing acting as the reference at the generation of the reference signals of the data transmitting apparatuses 3a to 3c. The bit operation per se in each of the data transmitting apparatuses 3a to 3c is the same.

As shown in the embodiments, by the data transmitting method, the data transmitting apparatus, and the data transmitting system according to the present invention, it is possible to generate and transmit in advance audio and video data earlier by exactly the amount of the transmission delay time so as to compensate for the transmission delay in the communication line and thereby process the audio and video data received on the reception side in real time.

Further, by the data transmitting method, the data transmitting apparatus, and the data transmitting system according to the present invention, at the measurement of the transmission delay time, the measurement can be easily carried out while making the content of the processing of each of the transmitting apparatuses the same, and the data can be transmitted while compensating for the transmission delay time among these transmitting apparatuses.

Further, by the data transmitting method, the data transmitting apparatus, and the data transmitting system according to the present invention, the transmission delay time among three or more transmitting apparatuses can be measured, and the data can be transmitted while compensating for the transmission delay time among these transmitting apparatuses.

Further, by the data transmitting method, the data transmitting apparatus, and the data transmitting system according to the present invention, for example data transmission between a transmitting apparatus of the SDI system and a transmitting apparatus of the ATM system becomes possible.

Further, by the data transmitting method, the data transmitting apparatus, and the data transmitting system according to the present invention, the data of a one-word 10-bit configuration of the SDI system can be converted to the data of a one-word eight-bit configuration of the ATM system.

Further, by the data transmitting method, the data transmitting apparatus, and the data transmitting system according to the present invention, the control data used for the editing of the audio and video data or the audio data for the communication between a user on the transmission side and a user on the reception side can be transmitted together with the audio and video data.

APPLICABILITY

The data transmitting method, the data transmitting apparatus, and the data transmitting system according to the present invention can be applied to various broadcasting systems and video processing systems such as a network system and remote editing system between the television broadcasting stations for transmitting the audio and video data via a communication line of the ATM communication line.

We claim:

1. A data transmitting method for transmitting transmission data via a communication line of an asynchronous transfer mode from a transmission side to a reception side whereby a processing time is determined so that said transmission data arrives at said processing time, comprising the steps of:

measuring a transmission delay time produced in predetermined transmission data transmitted and received between said transmission side and said reception side by measuring on said transmission side a time difference between first measuring data and second measuring data transmitted from said reception side, said predetermined transmission data including the first measuring data generated on said transmission side when said predetermined transmission data is transmitted from said transmission side to said reception side and including the first measuring data and the second measuring data generated on said reception side when said predetermined transmission data is transmitted from said reception side to said transmission side;

generating on said transmission side said transmission data at a first time preceding a second time when said transmission side transmits said predetermined transmission data by exactly said transmission delay time when a request for instructing a preceding transmission is transmitted from said reception side;

transmitting generated transmission data to said reception side via said communication line;

measuring on said reception side a two way delay time indicating a two way transmission delay time between said reception side and said transmission side as said transmission delay time;

generating a reference signal indicating a time when said predetermined transmission data is generated on said transmission side at a third time preceding said second time when said predetermined transmission data is transmitted by said transmission side by exactly said two way delay time;

transmitting the generated reference signal to said transmission side via said communication line;

generating on said transmission side said transmission data at a time indicated by said reference signal transmitted to said transmission side via said communication line; and transmitting generated transmission data to said reception side.

2. The data transmitting method as set forth in claim 1, wherein said transmission data is audio data and video data or one of said audio data and said video data.

3. A data transmitting method for transmitting transmission data via a communication line of an asynchronous transfer mode from a transmission side to a reception side whereby a processing time is determined so that said transmission data arrives at said processing time, comprising the steps of:

measuring a transmission delay time produced in predetermined transmission data transmitted and received between said transmission side and said reception side by measuring on said transmission side a time difference between first measuring data and second measuring data transmitted from said reception side, said predetermined transmission data including the first measuring data generated on said transmission side when said predetermined transmission data is transmitted from said transmission side to said reception side and including the first measuring data and the second measuring data generated on said reception side when said predetermined transmission data is transmitted from said reception side to said transmission side;

generating on said transmission side said predetermined transmission data at a first time preceding a second time when said transmission side transmits said predetermined transmission data by exactly said transmission delay time;

transmitting generated transmission data to said reception side via said communication line;

generating when an advance reproduction request is input from said reception side said transmission data at a third time preceding said second time when said transmission side transmits said transmission data by exactly said transmission delay time; and transmitting generated transmission data to said reception side via said communication line.

4. A data transmitting apparatus for transmitting transmission data via a communication line of an asynchronous transfer mode from a data transmitting device on a transmission side to a data transmitting device on a reception side whereby a processing time is determined for causing said transmission data to arrive at said processing time, said data transmitting apparatus comprising:

measuring means for measuring at said data transmitting device on said transmission side a transmission delay time produced in predetermined transmission data between said data transmitting device on said transmission side and said data transmitting device on said reception side by measuring a time difference between first measuring data and second measuring data transmitted from said data transmitting device on said reception side, said predetermined transmission data including the first measuring data generated from said data transmitting device on said transmission side when said predetermined transmission data is transmitted from said data transmitting device on said transmission side to said data transmitting device on said reception side and including the first measuring data and the second measuring data from said data transmitting device on said reception side when said predetermined transmission data is transmitted from said data transmitting device on said reception side to said data transmitting device on said transmission side;

transmitting means for generating said transmission data at a first time preceding a second time when said transmission side transmits said transmission data by exactly a transmission delay time produced between said data transmitting device on said transmission side and said data transmitting device on said reception side; and receiving means for receiving said transmission data and transmission delay time data indicating said transmission delay time via said communication line and for outputting said transmission delay time data to said transmitting means wherein said transmitting means includes:
  delay processing means for receiving said transmission delay time and for outputting a control signal for controlling generation of said transmission data of said transmission data generating means at said first time preceding said second time when said transmission side transmits said predetermined transmission data by exactly said transmission delay time produced between said data transmitting device on said transmission side and said data transmitting device on said reception side; and
  data transmitting means for receiving said transmission data from said transmission data generating means generated under control of said control signal and for transmitting said predetermined transmission data to said data transmitting apparatus on said reception side via said communication line.

5. The data transmitting apparatus as set forth in claim 4, wherein said predetermined transmission data is audio data and video data or one of said audio data and said video data.

6. The data transmitting apparatus as set forth in claim 4, wherein said delay processing means includes:
  a measurement data generating means for generating measurement data for measuring said transmission delay time; and
  a time difference detaching means for receiving said transmission delay time data and said measurement data from said measurement data generating means for calculating said transmission delay time and for outputting said control signal for controlling said generation of said predetermined transmission data.

7. The data transmitting apparatus as set forth in claim 4, wherein said data transmitting means includes:
  memory means for receiving said predetermined transmission data and for outputting said predetermined transmission data stored therein by a clock signal in synchronization with said communicating line; and
  a multiplexing means for multiplexing said predetermined transmission data output from said memory means and predetermined measurement data for measuring said transmission delay time at a predetermined position of a predetermined transmission packet and for outputting said predetermined transmission data and said predetermined measurement data to said communication line.

8. A data transmitting apparatus for transmitting transmission data via a communication line of an asynchronous transfer mode from a data transmitting device on a transmission side to a data transmitting device on a reception side whereby a processing time is determined for causing said transmission data to arrive at said processing time, said data transmitting apparatus comprising:

measuring means for measuring at said data transmitting device on said transmission side a transmission delay time produced in predetermined transmission data between said data transmitting device on said transmission side and said data transmitting device on said reception side by measuring a time difference between first measuring data and second measuring data transmitted from said data transmitting device on said reception side, said predetermined transmission data including the first measuring data generated from said data transmitting device on said transmission side when said predetermined transmission data is transmitted from said data transmitting device on said transmission side to said data transmitting device on said reception side and including the first measuring data and the second measuring data from said data transmitting device on said reception side when said predetermined transmission data is transmitted from said data transmitting device on said reception side to said data transmitting device on said transmission side;

transmitting means for generating said transmission data at a first time preceding a second time when said transmission side transmits said transmission data by exactly a transmission delay time produced between said data transmitting device on said transmission side and said data transmitting device on said reception side;

receiving means for receiving said transmission data and transmission delay time data indicating said transmission delay time via said communication line and for outputting said transmission delay time data to said transmitting means; and clock controlling means for receiving a reference signal of said data transmitting device on said transmission side, said reference signal being multiplexed on said predetermined transmission data output from said data receiving means, and for receiving a clock signal output from clock generating means, for outputting a first clock control signal for performing control which said clock signal output from said clock generating means is synchronized with said reference signal of said receiving means when said receiving means is synchronized to said predetermined transmission data, and for outputting a second clock control signal for performing control whereby said receiving means is synchronized with said clock signal from said clock generating means when an advance reproduction request command is input from said data transmitting device on said transmission side; and wherein
  said clock signal is output to said data receiving means based on said first and second clock control signals from said clock generating means.

9. A The data transmitting apparatus as set forth in claim 8, wherein said data receiving means includes
  a demultiplexing means for demultiplexing means for demultiplexing said predetermined transmission data contained in a predetermined transmission packet of said communication line and predetermined measurement data for measuring said transmission delay time and for outputting said predetermined measurement data to said transmitting means of said data transmitting apparatus.

10. A data transmitting method for transmitting transmission data of a D2 system including audio data and video data or one of said audio data and video data via a predetermined communication line of an asynchronous transfer mode supplying a predetermined clock by using a predetermined transmission packet, said data transmitting method comprising the steps of:

converting said transmission data to a word width adapted to said predetermined communication line;

shuffling said converted transmission data; and transmitting synchronization data, multiplexed in said predetermined transmission packet, for indicating an operation timing of a transmission side with respect to a line clock signal supplied by said predetermined communication line and used for matching operation timing on a reception side with operation timing on said transmission die, identification data used for identifying said transmission data, data amount indication data indicating a data amount of said transmission data contained in said transmission packet, shuffling data indicating a shuffling method with respect to said transmission data, predetermined control data transmitted between said transmission side and said reception side, measurement data used for measuring a transmission delay time produced between said transmission side and said reception side, call data used for a call between said transmission side and said reception side, and shuffled transmission data.

11. The data transmitting method as set forth in claim 10, further comprising the step of adding, when said predetermined communication line has an inhibit code for inhibiting transmission of said transmission data, additional data not causing said inhibit code to each data, wherein said inhibit code may be produced among data contained in said predetermined transmission packet when said data contained in said predetermined transmission packet is combined.

12. The data transmitting method as set forth in claim 10, further comprising the steps of:

determining on said reception side a first time when said transmission data is processed; and producing said transmission data contained in said predetermined transmission packet earlier than a second time when said transmission data is transmitted from said transmission side by exactly said transmission delay time received until said transmission data reaches said reception side from said transmission side.

13. The data transmitting method as set forth in claim 10, wherein said identification data includes delay time data indicating a first time when said transmission data is produced which is earlier than a second time when said transmission data is transmitted from said transmission side by exactly said transmission delay time.

14. The data transmitting method as set forth in claim 10, further comprising the steps of:

receiving on said reception side said predetermined packet from said predetermined communication line;

demultiplexing said transmission data, said synchronization data, said identification data, said data amount identification data, said data amount indication data, said shuffling data, said predetermined control data, said measurement data, and said call data from said predetermined transmission packet received from said predetermined communication line;

deshuffling said transmission data based on demultiplexed shuffling data; and converting deshuffled transmission data to an original word width of said deshuffled transmission data.

15. A data transmitting apparatus for transmitting transmission data from a first data transmitting device via a predetermined communication line of an asynchronous transfer mode whereby predetermined transmission data for which a processing time in a second data transmitting device is determined arrives at said processing time in said second data transmitting device, said data transmitting apparatus comprising:

transmission data generating means for generating said transmission data at a first time preceding a second time when said transmission data is transmitted from said first data transmitting device by exactly a transmission delay time produced between said first data transmitting device and said second data transmitting device;

word width converting means for converting said transmission data to a word width adapted to said predetermined communication line;

shuffling means for shuffling generated transmission data; and transmitting means for multiplexing shuffled transmission data, synchronization data indicating operation timing of said first data transmitting device with respect to a line clock signal supplied by said predetermined communication line and used for matching an operation timing of said second data transmitting device with said operation timing of said first data transmitting device, identification data used for identifying transmission data amount indication data indicating a data amount of said transmission data contained in a transmission packet, shuffling data indicating a shuffling method with respect to said transmission data, predetermined control data transmitted between a transmission side and a reception side, measurement data used for measuring said transmission delay time produced between said transmission side and said reception side, and call data used for a call between said transmission side and said reception side and for transmitting said transmission packet via said predetermined communication line to said second data transmitting device.

16. The data transmitting apparatus as set forth in claim 15, wherein said second data transmitting device includes:

receiving means for receiving said transmission packet from said predetermined communication line;

demultiplexing means for demultiplexing said transmission data, said synchronization data, said transmission data amount indication data, said shuffling data, said predetermined control data, said measurement data, and said call data from said transmission packet received from said predetermined communication line;

deshuffling means for deshuffling demultiplexed transmission data based on demultiplexed shuffling data; and word width reverse converting means for converting deshuffled transmission data to an original word width of said deshuffled transmission data.

17. A data transmitting system wherein:
predetermined transmission data is output from a predetermined recording and reproducing apparatus on a transmission side;
said predetermined transmission data reaches a data transmitting apparatus on a reception side for which a processing time is determined according to a processing time for transmission of said predetermined transmission data from a data transmitting apparatus on said transmission side via a predetermined communication line of an asynchronous transfer mode; and
a processing of said predetermined transmission data is carried out by a recording and reproducing apparatus on said reception side, said data transmitting system comprising:
measuring means for measuring at said data transmitting device on said transmission side a transmission delay time produced in predetermined transmission data between said data transmitting device on said transmission side and said data transmitting device on said reception side by measuring a time difference between first measuring data and second measuring data transmitted from said data transmitting device on said reception side, said predetermined transmission data including the first measuring data generated from said data transmitting device on said transmission side when said predetermined transmission data is transmitted from said data transmitting device on said transmission side to said data transmitting device on said reception side and including the first measuring data and the second measuring data from said data transmitting device on said reception side when said predetermined transmission data is transmitted from said data transmitting device on said reception side to said data transmitting device on said transmission side;
transmitting means for generating said transmission data at a first time preceding a second time when said transmission data from said predetermined recording and reproducing apparatus on said transmission side is transmitted by exactly a transmission delay time produced between said data transmitting apparatus on said transmission side and said data transmitting apparatus on said reception side; and
receiving means for receiving said transmission data and transmission delay time data indicating said transmission delay time via said predetermined communication line and for outputting said transmission delay time to said transmitting means.

18. The data transmitting system as set forth in claim 17, wherein said transmitting means includes:
delay processing means for receiving said transmission delay time data and for outputting a control signal for controlling output of said predetermined transmission data from said predetermined recording and reproducing apparatus on said transmission side at said first point in time preceding said second point in time when said predetermined recording and reproducing apparatus on said transmission side transmits said predetermined transmission data by exactly said transmission delay time to said recording and reproducing apparatus on said reception side; and
data transmitting means for receiving said predetermined transmission data and for transmitting said predetermined transmission data to said data transmitting apparatus on said reception side via said predetermined communication line.

19. The data transmitting system as set froth in claim 17, wherein said predetermined transmission data is audio data and video data or one of said audio data and said video data.

20. The data transmitting system as set forth in claim 18, wherein said delay processing means includes:
measurement data generating means for generating measurement data for measuring said transmission delay time; and
time difference detaching means for receiving said transmission delay time data and for receiving said measurement data from said measurement data generating means, for calculating said transmission delay time, and for outputting a control signal for controlling generation of said predetermined transmission data to said predetermined recording and reproducing apparatus on said transmission side.

21. The data transmitting system as set forth in claim 18, wherein said data transmitting means includes:
memory means for receiving said predetermined transmission data and for outputting stored transmission data according to a clock signal in synchronization with said predetermined communication line; and
multiplexing means for multiplexing said predetermined transmission data output from said memory means, for multiplexing measurement data for measuring said transmission delay time at a predetermined position of a predetermined transmission packet, and for outputting said predetermined transmission data and said measurement data to said predetermined communication line.

22. The data transmitting system as set forth in claim 17, wherein
said receiving means includes:
clock generating means;
data receiving means for receiving said predetermined transmission data transmitted via said predetermined communication line; and
clock controlling means for receiving a reference signal for said data transmitting apparatus on said transmission side multiplexed on said predetermined transmission data output from said data receiving means, for receiving a clock signal output from said clock generating means, for outputting a first clock control signal for performing control whereby said clock output from said clock generating means is synchronized with said reference signal of said receiving means when said receiving means is synchronized with said predetermined transmission data, and for outputting a second clock control signal for performing control whereby said receiving means is synchronized with said clock signal from said clock generating means when an advance reproduction request command is input from said data transmitting apparatus on said transmission side; and
wherein
said clock signal is output to said data receiving means and said recording and reproducing apparatus on said reception side based on said clock control signal from said clock generating means.

23. A data transmitting system as set froth in claim 22, wherein said data receiving means includes
demultiplexing means for demultiplexing said predetermined transmission data contained in a predetermined transmission packet, for demultiplexing predetermined measurement data for measuring said transmission delay time and for outputting demultiplexed measurement data to said transmitting means.

24. A data transmitting method for transmitting transmission data via a communication line of an asynchronous transfer mode from a transmission side to a reception side whereby a processing time is determined so that said transmission data arrives at said processing time, comprising the steps of:

measuring a transmission delay time produced in predetermined transmission data between said transmission side and said reception side by measuring on said transmission side a time difference between first measuring data and second measuring data transmitted from said reception side, said predetermined transmission data including the first measuring data generated on said transmission side when said predetermined transmission data is transmitted from said transmission side to said reception side and including the first measuring data and the second measuring data generated on said reception side when said predetermined transmission data is transmitted from said reception side to said transmission side;

generating on said transmission side said transmission data at a first time preceding a second time when said transmission side transmits said transmission data by exactly said transmission delay time when a request for instructing a preceding transmission is transmitted from said reception side; and transmitting said transmission data to said reception side via said communication line.

25. A data transmitting method as set forth in claim 24, wherein said predetermined transmission data is at least one of audio data and video data.

26. The data transmitting method as set forth in claim 24, wherein said first measuring data is a first internal reference signal of said transmission side, said second measuring data is a second internal reference signal of said reception side; and said transmission delay time is measured by measuring a time difference between said first internal reference signal and said second internal reference signal.

27. A data transmitting apparatus for transmitting transmission data via a communication line of an asynchronous transfer mode from a data transmitting device on a transmission side to a data transmitting device on a reception side, whereby a processing time necessary to cause said transmission data to arrive at said processing time is determined, said data transmitting apparatus comprising:

measuring means for measuring at said data transmitting device on said transmission side a transmission delay time produced in predetermined transmission data between said data transmitting device on said transmission side and said data transmitting device on said reception side by measuring a time difference between first measuring data and second measuring data transmitted from said data transmitting device on said reception side, said predetermined transmission data including the first measuring data generated from said data transmitting device on said transmission side when said predetermined transmission data is transmitted from said data transmitting device on said transmission side to said data transmitting device on said reception side and including the first measuring data and the second measuring data from said data transmitting device on said reception side when said predetermined transmission data is transmitted from said data transmitting device on said reception side to said data transmitting device on said transmission side;

transmission data generating means for generating at said data transmitting device on the transmission side said transmission data at a first time preceding a second time when said transmitting device on the transmission side transmits said transmission data by exactly said transmission delay time when a request for instructing a preceding transmission is transmitted from said reception side; and transmission data transmitting means for transmitting by said transmitting device on the transmission side said transmission data to said transmitting device on the reception side via said communication line.

28. The data transmitting apparatus as set forth in claim 27, wherein said predetermined transmission data is at least one of audio data and video data.

29. The data transmitting apparatus as set forth in claim 27, wherein said measuring means comprises:

data generating means for generating said first measuring data for the data transmitting device on said transmission side or generating said second measuring data for the data transmitting device on said reception side; and time difference detecting means receiving said first measuring data and said second measuring data for measuring said transmission delay time and for generating a control signal to control the generating of said transmission data, and wherein said transmission data generating means generates said transmission data preceding a time at which said transmission data is transmitted by exactly said transmission delay time based on said control signal generated by said time difference detecting means.

30. The data transmitting apparatus as set forth in claim 29, wherein said transmission data transmitting means comprises:

memory means for outputting the transmission data based on a synchronous clock with said communication line; and multiplexing means for multiplexing said transmission data output from said memory means and said first measuring data and/or said second measuring data on a predetermined position of a transmission packet consisting of said transmission data and outputting the transmission packet to the communication line.

31. The data transmitting apparatus as set forth in claim 27, wherein said data transmitting means on said reception side includes:

data receiving means for receiving said predetermined transmission data transmitted via said communication line; and clock controlling means for receiving a reference signal of said data transmitting device on said transmission side multiplexed on said predetermined transmission data output from said data receiving means and for receiving a clock signal output from clock signal generating means, for outputting a first clock control signal for synchronizing said clock signal output from said clock signal with said reference signal of said receiving means when said data receiving means is synchronized to said predetermined transmission data, and for outputting a second clock control signal for synchronizing said data receiving means with said clock signal from said clock generating means when an advance reproduction request command is input from said data transmitting device on said transmission side, wherein said clock signal is output to said data receiving means based on said first and second clock control signals from said clock signal generating means.

* * * * *